US007180957B2

(12) United States Patent
Bessios et al.

(10) Patent No.: US 7,180,957 B2
(45) Date of Patent: *Feb. 20, 2007

(54) TECHNIQUE FOR UTILIZING SPARE BANDWIDTH RESULTING FROM THE USE OF A TRANSITION-LIMITING CODE IN A MULTI-LEVEL SIGNALING SYSTEM

(75) Inventors: Anthony Bessios, Fremont, CA (US); William Stonecypher, San Jose, CA (US); Jared Zerbe, Woodside, CA (US); Carl Werner, Los Gatos, CA (US)

(73) Assignee: Rambus Inc., Los Altos, CA (US)

( * ) Notice: Subject to any disclaimer, the term of this patent is extended or adjusted under 35 U.S.C. 154(b) by 568 days.

This patent is subject to a terminal disclaimer.

(21) Appl. No.: 10/667,355

(22) Filed: Sep. 23, 2003

(65) Prior Publication Data

US 2004/0109510 A1    Jun. 10, 2004

Related U.S. Application Data

(63) Continuation-in-part of application No. 10/314,985, filed on Dec. 10, 2002.

(51) Int. Cl.
 *H04L 25/34* (2006.01)
 *H04L 25/49* (2006.01)
(52) U.S. Cl. ..................................... 375/286
(58) Field of Classification Search ........ 375/286–294, 375/353
 See application file for complete search history.

(56) References Cited

U.S. PATENT DOCUMENTS

| | | | |
|---|---|---|---|
| 3,733,550 A * | 5/1973 | Tazaki et al. ............... 375/288 |
| 3,754,237 A | 8/1973 | de Laage de Meux |
| 3,781,686 A * | 12/1973 | Ching ........................ 375/245 |
| 3,940,694 A * | 2/1976 | Price et al. ................. 708/277 |
| 3,988,676 A * | 10/1976 | Whang ....................... 375/293 |
| 4,408,189 A | 10/1983 | Betts et al. |
| 4,486,739 A | 12/1984 | Franaszek et al. |
| 4,495,626 A | 1/1985 | Brunin et al. |
| 4,524,462 A * | 6/1985 | Cottatelucci ................. 398/79 |
| 4,665,517 A | 5/1987 | Widmer |
| 4,667,337 A | 5/1987 | Fletcher |
| 4,855,742 A | 8/1989 | Verboom |
| 5,142,167 A | 8/1992 | Temple et al. |
| 5,655,078 A | 8/1997 | Anderson et al. |

(Continued)

OTHER PUBLICATIONS

Mrcea R. Stan et al., "Coding a terminated bus for low power," Great Lakes Sympon VLSI., Mar. 1995, pp. 70-73.

(Continued)

*Primary Examiner*—Jay K. Patel
(74) *Attorney, Agent, or Firm*—Hunton & Williams LLP

(57) ABSTRACT

A technique for utilizing spare bandwidth resulting from the use of a transition-limiting code in a multi-level signaling system is disclosed. In one particular exemplary embodiment, the technique may be realized as a method for utilizing spare bandwidth resulting from the use of a transition-limiting code in a multi-level signaling system, wherein the transition-limiting code has a characteristic wherein a signal level is periodically unused. Such a method may comprise modifying the transition-limiting code such that the periodically unused signal level is used to represent additional information.

49 Claims, 17 Drawing Sheets

U.S. PATENT DOCUMENTS

| | | |
|---|---|---|
| 5,903,231 A | 5/1999 | Emelko |
| 5,999,571 A | 12/1999 | Shin et al. |
| 6,005,895 A | 12/1999 | Perino et al. |
| 6,018,304 A | 1/2000 | Bessios |
| 6,031,472 A | 2/2000 | Johnson et al. |
| 6,067,326 A | 5/2000 | Jonsson et al. |
| 6,078,627 A | 6/2000 | Crayford |
| 6,094,461 A | 7/2000 | Heron |
| 6,147,544 A * | 11/2000 | Tanizaki et al. ............ 327/403 |
| 6,226,330 B1 | 5/2001 | Mansur |
| 6,324,602 B1 | 11/2001 | Chen et al. |
| 6,538,584 B2 | 3/2003 | Borkar et al. |
| 6,731,692 B1 | 5/2004 | Bhoja |
| 2003/0108134 A1 | 6/2003 | Stonick et al. |
| 2003/0152154 A1 | 8/2003 | Johnson |

OTHER PUBLICATIONS

Mrcea R. Stan, "Bus-Invert coding for low power I/O," IEEE Transactions On Very Large Scale Integration (VLSI) Systems, vol. XX, No. Y, 1999, pp. 100-108.

Kazuyuki Nakamura et al., A 500-MHz 4-Mb CMOS pipeline-burst cache SRAM with point-to-point noise reduction coding I/O.

David D. Falconer et al., "Bounds on error-pattern probabilities for digital communications systems," IEEE Transactions Communications, vol. COM-20, No. 2, Apr. 1972, pp. 132-139.

Ramin Farjad-Rad et al., "A0.3-μm CMOS 8-Gb/s 4-PAM serial link transceiver," IEEE Journal of Solid-State Circuits, vol. 35, No. 5, May, 2000.

A. X. Widmer et al., "A dc-balanced, partitioned-block, 8B/10B transmission code," pp. 440-451.

International Search Report dated Oct. 8, 2004 for International Application No. PCT/US03/38889.

* cited by examiner

CASE I

Symbol Domain

Case I: $[(S_5^{(k)} = 3) \& (S_2^{(k+1)} = \pm 1 \text{ or } 3)]$ OR $[(S_5^{(k)} = \pm 1) \& (S_2^{(k+1)} = 3)]$ (a) if Case I & $(S_1^{(k+1)} = 1)$ ⟶ $S_1^{(k+1)} = 3$ (b) if Case I & $(S_1^{(k+1)} = -1)$ ⟶ $S_1^{(k+1)} = 3$

Bit Domain

Case I: $\left[(C_9^{(k)} = C_{10}^{(k)} = 0) \& [(C_3^{(k+1)} = C_4^{(k+1)} = 0) \text{ OR } (C_4^{(k+1)} = 0)]\right]$ OR $\left[(C_{10}^{(k)} = 1) \& (C_3^{(k+1)} = C_4^{(k+1)} = 0)\right]$ (a) if Case I & $(C_1^{(k+1)} = 0) \& (C_2^{(k+1)} = 1)$ ⟶ invert $C_2^{(k+1)}$ (b) if Case I & $(C_1^{(k+1)} = 1) \& (C_2^{(k+1)} = 1)$ ⟶ invert $C_1^{(k+1)}$ and $C_2^{(k+1)}$ m1 = Case I & $(C_2^{(k+1)} = 1)$

Figure 4

CASE II

Symbol Domain

Case II: $[(S_5^{(k)} = -3) \, \& \, (S_2^{(k+1)} = \pm 1 \text{ or } -3)]$ OR $[(S_5^{(k)} = \pm 1) \, \& \, (S_2^{(k+1)} = -3)]$ (a) if Case II & $(S_1^{(k+1)} = -1)$ ⟶ $S_1^{(k+1)} = -3$ (b) if Case II & $(S_1^{(k+1)} = 1)$ ⟶ $S_1^{(k+1)} = -3$

Bit Domain

Case II: $\big[[(C_9^{(k)} = 1) \, \& \, (C_{10}^{(k)} = 0)] \, \& \, [(C_4^{(k+1)} = 1) \text{ OR } ((C_3^{(k+1)} = 1) \, \& \, (C_4^{(k+1)} = 0))]\big]$ OR $\big[(C_{10}^{(k)} = 1) \, \& \, [(C_3^{(k+1)} = 1) \, \& \, (C_4^{(k+1)} = 0)]\big]$ (a) if Case II & $(C_1^{(k+1)} = C_2^{(k+1)} = 1)$ ⟶ invert $C_2^{(k+1)}$ (b) if Case II & $\big[(C_1^{(k+1)} = 0) \, \& \, (C_2^{(k+1)} = 1)\big]$ ⟶ invert $C_1^{(k+1)}$ and $C_2^{(k+1)}$ m2 = Case II & $(C_2^{(k+1)} = 1)$

Figure 5

CASE IV

Symbol Domain

Case IV: $(S_5^{(k)} = \pm 1)$ & $(S_2^{(k+1)} = \pm 1)$ (a) if Case IV & $(S_1^{(k+1)} = 1)$ → $S_1^{(k+1)} = 3$ (a) if Case IV & $(S_1^{(k+1)} = -1)$ → $S_1^{(k+1)} = -3$ (b) if Case IV & $(S_1^{(k+1)} = 1)$ → $S_1^{(k+1)} = -3$ (b) if Case IV & $(S_1^{(k+1)} = -1)$ → $S_1^{(k+1)} = 3$

Bit Domain

Case IV: $(C_{10}^{(k)} = 1)$ & $(C_4^{(k+1)} = 1)$ (a) if Case IV & $(C_2^{(k+1)} = 1)$ → invert $C_2^{(k+1)}$ (b) if Case IV & $(C_2^{(k+1)} = 1)$ → invert $C_1^{(k+1)}$ and $C_2^{(k+1)}$ m4 = Case IV & $(C_2^{(k+1)} = 1)$

Figure 6

Error Detection

Symbol Domain

[(Case I & ($S_1^{(k+1)} = -3$)] OR [(Case II & ($S_1^{(k+1)} = 3$)] OR [Case III & ($S_1^{(k+1)} = \underline{\pm 3}$)] → Error Detected where Case III: [($S_5^{(k)} = 3$) & ($S_2^{(k+1)} = -3$)] OR [($S_5^{(k)} = -3$) & ($S_2^{(k+1)} = 3$)]

Bit Domain

[Case I & ($C_1^{(k+1)} = 1$) & ($C_2^{(k+1)} = 0$)] OR [Case II & ($C_1^{(k+1)} = C_2^{(k+1)} = 0$)] OR [Case III & ($C_2^{(k+1)} = 0$)] → Error Detected where Case III: [($C_9^{(k)} = C_{10}^{(k)} = C_4^{(k+1)} = 0$) & ($C_3^{(k+1)} = 1$)] OR [($C_9^{(k)} = 1$) & ($C_{10}^{(k)} = C_3^{(k+1)} = C_4^{(k+1)} = 0$)]

Figure 11

TECHNIQUE FOR UTILIZING SPARE BANDWIDTH RESULTING FROM THE USE OF A TRANSITION-LIMITING CODE IN A MULTI-LEVEL SIGNALING SYSTEM

CROSS-REFERENCE TO RELATED APPLICATIONS

This patent application is a continuation-in-part application of U.S. patent application Ser. No. 10/314,985 Client Reference No. RA262), filed Dec. 10, 2002, which is hereby incorporated by reference herein in its entirety.

FIELD OF THE INVENTION

The present invention relates generally to multi-level signaling and, more particularly, to a technique for utilizing spare bandwidth resulting from the use of a transition-limiting code in a multi-level signaling system.

BACKGROUND OF THE INVENTION

High-speed serial link channels delivering an effective data rate above 5 Gb/s in a backplane environment are subject to significant signal distortion due to inter-symbol interference (ISI). Transmitters and receivers need to compensate for most of the signal distortion using very low complexity schemes in order to obtain a target bit error rate (BER) of less than or equal to $10^{-17}$ at Gb/s rates and under severe power and complexity restrictions. This constrained space presents significant challenges to well-known signal processing and coding techniques, and sub-optimal but efficient alternatives are sometimes needed to fulfill the task.

Attenuation caused by conductor and dielectric losses causes dispersion ISI. Another important ISI component is reflections, which are essentially multipath components of a signal and originate from impedance discontinuities such as those caused by connectors of line cards at both transmit and receive ends. In addition to ISI distortion, cross-talk effects from far and near end adjacent channels is becoming increasingly significant.

To counteract channel attenuation at high bit rates, 4-level pulse amplitude modulation (4-PAM) signaling is often used instead of conventional 2-level pulse amplitude modulation (2-PAM) signaling. That is, in a 2-PAM signaling system, each conductor in the system may carry signals at one of two signal levels (i.e., at either a logic zero level or a logic one level). Thus, in a 2-PAM signaling system, each conductor in the system can only transmit one bit of data per bit time. However, in a 4-PAM signaling system, each conductor in the system may carry signals at four different signal levels (i.e., four different symbols). Thus, in a 4-PAM signaling system, each conductor in the system can transmit two bits of data simultaneously at one half the symbol rate for an equivalent bandwidth.

In a 4-PAM signaling system that uses current-based output drivers, the four different signal levels are represented by different current values. For example, the four different current levels may be identified as 0i, 1i, 2i, and 3i. Similarly, in a 4-PAM transmission system that uses voltage-based output drivers, the four different signal levels are represented by different voltage values. For example, the four different voltage levels may be identified as 0v, 1v, 2v, and 3v. These types of output drivers are typically connected in a transmission line environment that presents an effective resistance or impedance to the output driver. This transmission line impedance causes the output voltage to change if the output current from the current driver changes, and causes the output current to change if the output voltage from the voltage driver changes.

A 4-PAM signaling system may be used in systems having either differential pairs of signals or single-ended signals referenced to ground. In a 4-PAM signaling system utilizing many single-ended output drivers, it is desirable to maintain the total signal current required to transmit a byte of data (or codeword) at a relatively constant current level in comparison to other bytes of data (or codewords). If the signal current fluctuates greatly from one byte to the next, current changes flow through power supply connections and cause noise. These current changes occur when using either voltage drivers or current drivers. The noise on the power supply increases in systems that have high data transmission rates and fast edge rate transmitters. This noise on the power supply degrades the voltage margins of the signals.

Understandably, while advantageous in channels with dominant attenuation, 4-PAM signaling systems may be more sensitive to reflections and cross-talk than 2-PAM signaling systems due to the reduction in signal margin as a result of carrying more information per symbol. Thus, in cases where high loss and reflections are combined, the advantages of 4-PAM signaling over 2-PAM signaling may be lost.

In order to preserve the advantages of 4-PAM signaling over 2-PAM signaling, it is desirable to eliminate full-swing transitions (FST) between sequential 4-PAM symbols, as illustrated in the above-referenced U.S. patent application Ser. No. 10/314,985. This enhances system performance in terms of: 1.) voltage margins (Vm) by reducing peak distortion (PD) via the elimination of one or more worst case sequences; and 2.) timing margins (Tm), especially at outer eyes where FST close eyes the most.

It is also desirable to secure a minimum density of desirable symbol transitions useful for clock recovery, as also illustrated in the above-referenced U.S. patent application Ser. No. 10/314,985. These clock data recovery (CDR) transitions prevent continuous phase drifting from an optimum sampling point at the center of an eye in plesiochronous systems with frequency offsets between received data and a local receive clock.

As described in the above-referenced U.S. patent application Ser. No. 10/314,985, transition-limiting codes may be utilized in multi-PAM signaling systems to realize the above-mentioned desirable qualities. As also described in the above-referenced U.S. patent application Ser. No. 10/314,985, a unique property exists in certain transition-limiting codes, whereby certain outer multi-PAM signal levels are periodically unused. As further described in the above-referenced U.S. patent application Ser. No. 10/314,985, these periodically unused outer multi-PAM signal levels may be used in framing codewords (i.e., identifying the boundary of a codeword). However, the use of these periodically unused outer multi-PAM signal levels is not limited in this regard. That is, since these periodically unused outer multi-PAM signal levels essentially constitute spare bandwidth, it may be desirable to use these periodically unused outer multi-PAM signal levels for other beneficial purposes.

In view of the foregoing, it would be desirable to provide a technique for utilizing spare bandwidth resulting from the use of a transition-limiting code in a multi-level signaling system in an efficient and cost effective manner.

SUMMARY OF THE INVENTION

According to the present invention, a technique for utilizing spare bandwidth resulting from the use of a transition-limiting code in a multi-level signaling system is provided. In one particular exemplary embodiment, the technique may be realized as a method for utilizing spare bandwidth resulting from the use of a transition-limiting code in a multi-level signaling system, wherein the transition-limiting code has a characteristic wherein a signal level is periodically unused. Such a method may comprise modifying the transition-limiting code such that the periodically unused signal level is used to represent additional information.

In accordance with other aspects of this particular exemplary embodiment of the present invention, the transition-limiting code may beneficially be formed by encoding digital values represented by sets of N bits to provide corresponding sets of P symbols. Also, each set of P symbols may beneficially be formed with Q bits, wherein Q is greater than N. For example, N may equal 8 and Q may equal 10, and each symbol may represent two bits.

In accordance with further aspects of this particular exemplary embodiment of the present invention, modifying the transition-limiting code may beneficially comprise changing the logic state of at least one codeword bit in the transition-limiting code.

In accordance with additional aspects of this particular exemplary embodiment of the present invention, the additional information may beneficially comprise control information, data information, error information, framing information, and/or synchronization information.

In accordance with still other aspects of this particular exemplary embodiment of the present invention, the method may further beneficially comprise transmitting the modified transition-limiting code. If such is the case, the modified transition-limiting code may beneficially be transmitted at four signal levels on a single transmission medium such as, for example, a single electrical conductor, a differential pair of electrical conductors, or an optical fiber. Also, the method may then further beneficially comprise receiving the transmitted modified transition-limiting code, and detecting the additional information in the received modified transition-limiting code. The method may then still further beneficially comprise removing the additional information from the received modified transition-limiting code so as to return the modified transition-limiting code to an original unmodified state. The method may then even still further beneficially comprise decoding the original transition-limiting code after the additional information is removed.

In accordance with still further aspects of this particular exemplary embodiment of the present invention, the transition-limiting code may beneficially have a further characteristic wherein a plurality of signal levels may be periodically unused, and wherein one or more of the plurality of periodically unused signal levels may be restricted from being used to represent additional information at least at certain times. If such is the case, and if the modified transition-limiting code is transmitted, the method may further beneficially comprise receiving the transmitted modified transition-limiting code, and detecting the use of a signal level that has been restricted. Also, if such is the case, the method may further beneficially comprise generating an error signal based at least in part upon the detected restricted signal level use.

In another particular exemplary embodiment of the present invention, the technique may be realized as at least one signal embodied in at least one carrier wave for transmitting a computer program of instructions configured to be readable by at least one processor for instructing the at least one processor to execute a computer process for performing the above-described method.

In still another particular exemplary embodiment of the present invention, the technique may be realized as at least one processor readable carrier for storing a computer program of instructions configured to be readable by at least one processor for instructing the at least one processor to execute a computer process for performing the above-described method.

In still another particular exemplary embodiment of the present invention, the technique may be realized as an apparatus for utilizing spare bandwidth resulting from the use of a transition-limiting code in a multi-level signaling system, wherein the transition-limiting code has a characteristic wherein a signal level is periodically unused. Such an apparatus may comprise a modifier for modifying the transition-limiting code such that the periodically unused signal level is used to represent additional information.

In accordance with other aspects of this particular exemplary embodiment of the present invention, the apparatus may further beneficially comprise a transmitter for transmitting the modified transition-limiting code, a receiver for receiving the transmitted modified transition-limiting code, a detector for detecting the additional information in the received modified transition-limiting code, and/or a decoder for decoding the original transition-limiting code after the additional information is removed.

In accordance with further aspects of this particular exemplary embodiment of the present invention, the transition-limiting code may beneficially have a further characteristic wherein a plurality of signal levels may be periodically unused, and wherein one or more of the plurality of periodically unused signal levels may be restricted from being used to represent additional information at least at certain times. If such is the case, and if the modified transition-limiting code is transmitted, the apparatus may further beneficially comprise a receiver for receiving the transmitted modified transition-limiting code, and a detector for detecting the use of a signal level that has been restricted. Also, if such is the case, the detector may beneficially generate an error signal based at least in part upon the detected restricted signal level use.

In accordance with additional aspects of this particular exemplary embodiment of the present invention, the apparatus may beneficially comprise additional features similar to those recited above with respect to the above-described method.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 4 shows symbol domain and codeword bit domain logic tables for determining when spare bandwidth associated with periodically unused outer 4-PAM signal levels may be used for other beneficial purposes in a first scenario in accordance with one embodiment of the present invention.

FIG. 5 shows symbol domain and codeword bit domain logic tables for determining when spare bandwidth associated with periodically unused outer 4-PAM signal levels may be used for other beneficial purposes in a second scenario in accordance with one embodiment of the present invention.

FIG. 6 shows symbol domain and codeword bit domain logic tables for determining when spare bandwidth associated with periodically unused outer 4-PAM signal levels may be used for other beneficial purposes in a third scenario in accordance with one embodiment of the present invention.

FIG. 11 shows symbol domain and codeword bit domain logic tables for determining when spare bandwidth associated with periodically unused outer 4-PAM signal levels may be used for error detection in accordance with one embodiment of the present invention.

DETAILED DESCRIPTION OF EXEMPLARY EMBODIMENT(S)

Figure 1:
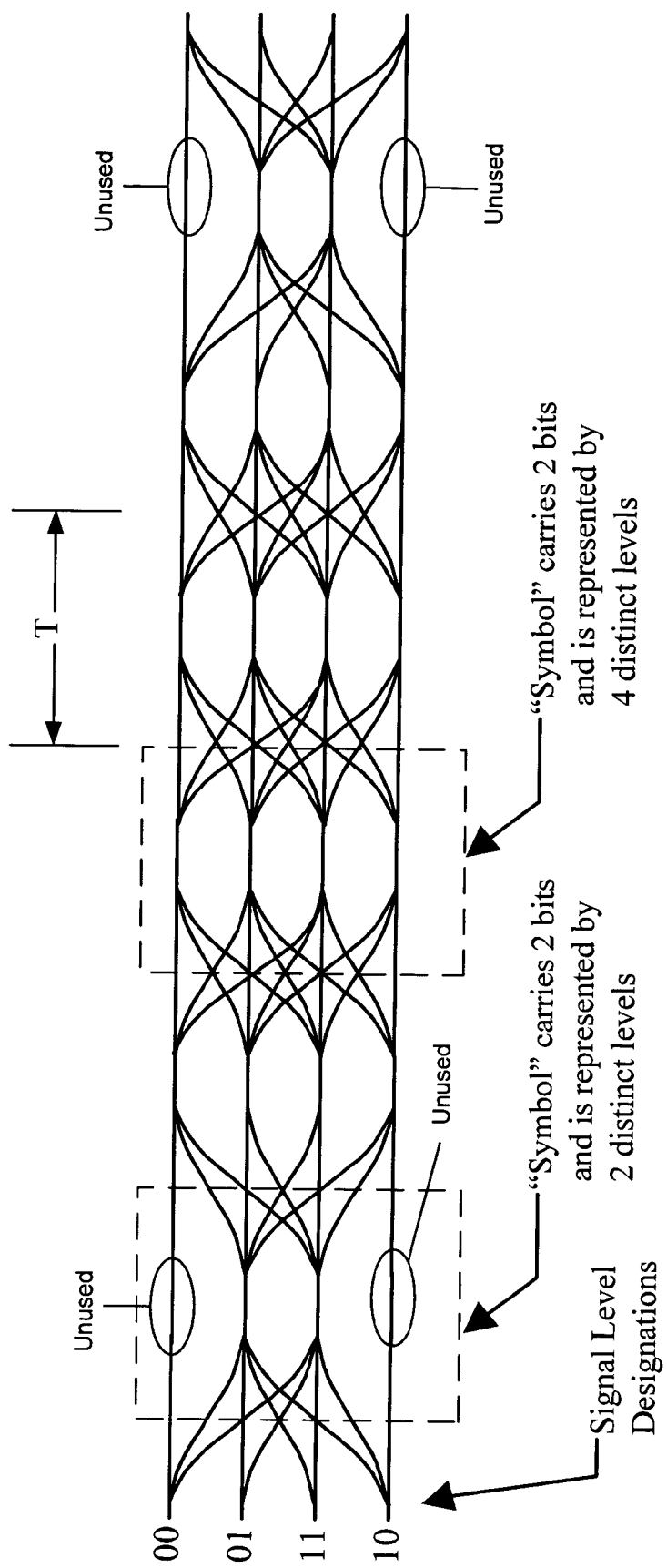
FIG. 1 shows a signal transition diagram for a 4-PAM signaling system utilizing a 4S5S transition-limiting code.

Referring to FIG. 1, there is shown a signal transition diagram for a 4-PAM signaling system utilizing a 4S5S transition-limiting code as described in the above-referenced U.S. patent application Ser. No. 10/314,985. As shown in FIG. 1, the 4S5S transition-limiting code has a unique property wherein two outer 4-PAM signal levels are periodically unused. That is, assuming T is a symbol period, every 5T two outer 4-PAM signal levels (i.e., the uppermost and lowermost signal levels) are not used (i.e., there are no transitions starting from or ending at two outer 4-PAM signal levels). As described in the above-referenced U.S. patent application Ser. No. 10/314,985, these periodically unused outer 4-PAM signal levels may be used in framing codewords (i.e., identifying the boundary of a codeword). However, the use of these periodically unused outer 4-PAM signal levels is not limited in this regard. That is, since these periodically unused outer 4-PAM signal levels essentially constitute spare bandwidth, these periodically unused outer 4-PAM signal levels may be used for other beneficial purposes in accordance with the present invention.

Figure 2:
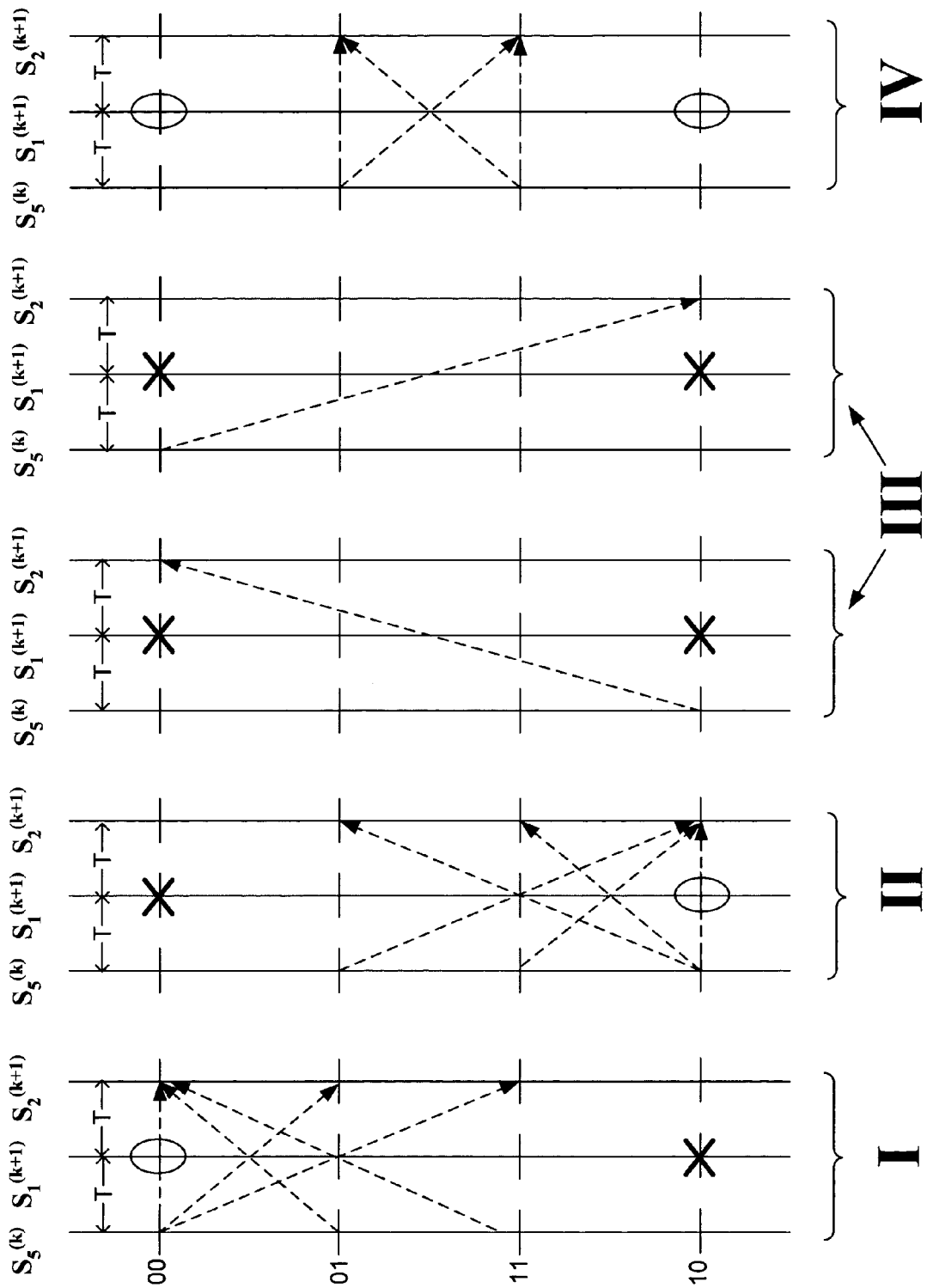
FIG. 2 shows a plurality of state transition diagrams for a 4-PAM signaling system utilizing a 4S5S transition-limiting code.

Referring to FIG. 2, there is shown a plurality of state transition diagrams for a 4-PAM signaling system utilizing a 4S5S transition-limiting code as described in the above-referenced U.S. patent application Ser. No. 10/314,985. In the 4S5S transition-limiting code described in the above-referenced U.S. patent application Ser. No. 10/314,985, the outer 4-PAM signal levels are periodically unused. One reason for periodically not using the outer 4-PAM signal levels is to eliminate full-swing transitions between symbols. Eliminating full-swing transitions can reduce signal distortions, such as inter-symbol interference (ISI), which can affect speed and/or the error rate at which data can be transmitted.

The plurality of state transition diagrams shown in FIG. 2 illustrate four separate cases (i.e., Cases I, II, III, and IV) when the above-described periodically unused outer 4-PAM signal levels may or may not be used for other beneficial purposes in accordance with the present invention. In each case, a symbol may be represented by $s_x^{(k)}$, wherein x represents the symbol number within a codeword, and k represents the codeword number. In the embodiment described with respect to FIG. 2, the periodically unused outer 4-PAM signals levels are located in the $1^{st}$ symbol of each codeword (i.e., at each $s_1^{(k+1)}$ signal level). For example, in Case I, when the signal level of the fifth symbol in a first codeword (i.e., $s_5^{(k)}$, wherein k=1, 2, 3, ... ) is 00 and the signal level of the second symbol in a second codeword (i.e., $s_2^{(k+1)}$, wherein k=1, 2, 3, ... ) is 00, 01, or 11, then the uppermost signal level (i.e., 00) of the first symbol in the second codeword (i.e., $s_1^{(k+1)}$, wherein k=1, 2, 3, ... ) may be used for other beneficial purposes in accordance with the present invention. This is because such use would not violate the transition-limiting properties (e.g., elimination of full-swing transitions) of the transition-limiting code. For example, if $s_5^{(k)}$ is 00 and $s_2^{(k+1)}$ is 11, then $s_1^{(k+1)}$ may be 00 because neither the transition from $s_5^{(k)}$ to $s_1^{(k+1)}$ (i.e., 00 to 00) nor the transition from $s_1^{(k+1)}$ to $s_2^{(k+1)}$ (i.e., 00 to 11) is a full-swing transition when using the Gray code assignment shown in FIG. 2. Also in Case I, when the signal level of the second symbol in the second codeword (i.e., $s_2^{(k+1)}$, wherein k=1, 2, 3, ... ) is 00 and the signal level of the fifth symbol in the first codeword (i.e., $s_5^{(k)}$, wherein k=1, 2, 3, ... ) is 01 or 11, then the uppermost signal level (i.e., 00) of the first symbol in the second codeword (i.e., $s_1^{(k+1)}$, wherein k=1, 2, 3, ... ) may be used for other beneficial purposes in accordance with the present invention because such use would not violate the transition-limiting properties of the transition-limiting code. However, the lowermost signal level (i.e., 10) of the first symbol in the second codeword (i.e., $s_1^{(k+1)}$, wherein k=1, 2, 3, ... ) may not be used for other beneficial purposes in accordance with the present invention in any of the above-mentioned Case I scenarios because such use would violate the transition-limiting properties of the transition-limiting code.

Analogously, in Case II, when the signal level of the fifth symbol in the first codeword (i.e. $s_5^{(k)}$, wherein k=1, 2, 3, . . . ) is 10 and the signal level of the second symbol in the second codeword (i.e., $s_2^{(k+1)}$, wherein k=1, 2, 3, . . . ) is 01, 11, or 10, then the lowermost signal level (i.e., 10) of the first symbol in the second codeword (i.e., $s_1^{(k+1)}$, wherein k=1, 2, 3, . . . ) may be used for other beneficial purposes in accordance with the present invention because such use would not violate the transition-limiting properties of the transition-limiting code. Also in Case II, when the signal level of the second symbol in the second codeword (i.e., $s_2^{(k+1)}$, wherein k=1, 2, 3, . . . ) is 10 and the signal level of the fifth symbol in the first codeword (i.e., $s_5^{(k)}$, wherein k=1, 2, 3, . . . ) is 01 or 11, then the lowermost signal level (i.e., 10) of the first symbol in the second codeword (i.e., $s_1^{(k+1)}$, wherein k=1, 2, 3, . . . ) may be used for other beneficial purposes in accordance with the present invention because such use would not violate the transition-limiting properties of the transition-limiting code. However, the uppermost signal level (i.e., 00) of the first symbol in the second codeword (i.e., $s_1^{(k+1)}$, wherein k=1, 2, 3, . . . ) may not be used for other beneficial purposes in accordance with the present invention in any of the above-mentioned Case II scenarios because such use would violate the transition-limiting properties of the transition-limiting code.

In Case III, when the signal level of the fifth symbol in the first codeword (i.e., $s_5^{(k)}$, wherein k=1, 2, 3, . . . ) is 10 and the signal level of the second symbol in the second codeword (i.e., $s_2^{(k+1)}$, wherein k=1, 2, 3, . . . ) is 00, then neither the uppermost signal level (i.e., 00) nor the lowermost signal level (i.e., 10) of the first symbol in the second codeword (i.e., $s_1^{(k+1)}$, wherein k=1, 2, 3, . . . ) may be used for other beneficial purposes in accordance with the present invention because such use would violate the transition-limiting properties of the transition-limiting code. Also in Case III, when the signal level of the fifth symbol in the first codeword (i.e., $s_5^{(k)}$, wherein k=1, 2, 3, . . . ) is 00 and the signal level of the second symbol in the second codeword (i.e., $s_2^{(k+1)}$, wherein k=1, 2, 3, . . . ) is 10, then neither the uppermost signal level (i.e., 00) nor the lowermost signal level (i.e., 10) of the first symbol in the second codeword (i.e., $s_1^{(k+1)}$, wherein k=1, 2, 3, . . . ) may be used for other beneficial purposes in accordance with the present invention because such use would violate the transition-limiting properties of the transition-limiting code.

However, in Case IV, when the signal level of the fifth symbol in the first codeword (i.e., $s_5^{(k)}$, wherein k=1, 2, 3, . . . ) is 01 and the signal level of the second symbol in the second codeword (i.e., $s_2^{(k+1)}$, wherein k=1, 2, 3, . . . ) is 01 or 11, then either the uppermost signal level (i.e., 00) or the lowermost signal level (i.e., 10) of the first symbol in the second codeword (i.e., $s_1^{(k+1)}$, wherein k=1, 2, 3, . . . ) may be used for other beneficial purposes in accordance with the present invention because such use would not violate the transition-limiting properties of the transition-limiting code. Also in Case IV, when the signal level of the fifth symbol in the first codeword (i.e., $s_5^{(k)}$, wherein k=1, 2, 3, . . . ) is 11 and the signal level of the second symbol in the second codeword (i.e., $s_2^{(k+1)}$, wherein k=1, 2, 3, . . . ) is 01 or 11, then either the uppermost signal level (i.e., 00) or the lowermost signal level (i.e., 10) of the first symbol in the second codeword (i.e., $s_1^{(k+1)}$, wherein k=1, 2, 3, . . . ) may be used for other beneficial purposes in accordance with the present invention because such use would not violate the transition-limiting properties of the transition-limiting code.

At this point it should be noted that the signal level designations shown in FIGS. 1 and 2 are such that a two-bit binary value is assigned to each signal level (e.g., a Gray code assignment). Each sequential symbol carries this two-bit binary value in a 4-PAM signaling system. It should be noted, however, that the present invention is not limited to 4-PAM signaling systems or to signal level designations having Gray code assignments.

At this point it should be noted that the binary signal level designations shown in FIGS. 1 and 2 may be associated with many different combinations of signal voltage, current, or other unit levels. For example, in a very simplified case, the 00 binary signal level designation may be associated with +0.500 volts, the 01 binary signal level designation may be associated with +0.167 volts, the 11 binary signal level designation may be associated with −0.167 volts, and the 10 binary signal level designation may be associated with −0.500 volts. Of course, the present invention is not limited in this regard since, as mentioned above, the binary signal level designations shown in FIGS. 1 and 2 may be associated with many different combinations of signal voltages. The present invention may also be used in systems in which the signal level designations are expressed in terms of current, or other unit, levels. In some instances, it is useful to express the binary signal level designations using unitless values which are representative of normalized amplitudes of voltages associated with the binary signal level designations. For example, in a 4-PAM signaling system, the binary signal level designations may be expressed as −3, −1, +1, and +3. Expressing the binary signal level designations in this manner facilitates expressing the sum of the levels and differences between levels as integer values.

It should also be noted that, with respect to Cases I–IV shown in FIG. 2, the primary transition-limiting property of the transition-limiting code was generally the elimination of full-swing transitions between symbols, and specifically the elimination of full-swing transitions to/from the first symbol of each codeword. Other transition-limiting codes using different transition-limiting properties in addition to, or instead of, the elimination of full-swing transitions may be used. For example, in order to further reduce signal distortion, a transition-limiting code having transition-limiting properties of eliminating both full and second order swing transitions may be used. In such an example, again using a Gray code assignment and the symbol definition provided above, when $s_5^{(k)}$ is 00 and $s_2^{(k+1)}$ is either 00 or 01, then $s_1^{(k+1)}$ may be 00 because neither the transition from $s_5^{(k)}$ to $s_1^{(k+1)}$ (i.e., 00 to 00) nor the transitions from $s_1^{(k+1)}$ to $s_2^{(k+1)}$ (i.e., 00 to 00 or 00 to 01) are full or second order swing transitions, and the upper 4-PAM signal level can still be used for other beneficial purposes. In another example, the transition-limiting properties of the transition-limiting code may include the elimination of full-swing transitions and a guaranteed clock data recovery (CDR) transition density. For example, the guaranteed CDR transition density may require that there be at least one symbol transition in the 4 possible symbol transitions in a 5 symbol codeword. In such an example, if $s_2^{(k+1)}$ is 00, $s_3^{(k+1)}$ is 00, $s_4^{(k+1)}$ is 00, and $s_5^{(k+1)}$ is 00, then the CDR transition density property would prohibit $s_1^{(k+1)}$ from being changed from 01 to 00.

Figure 3:
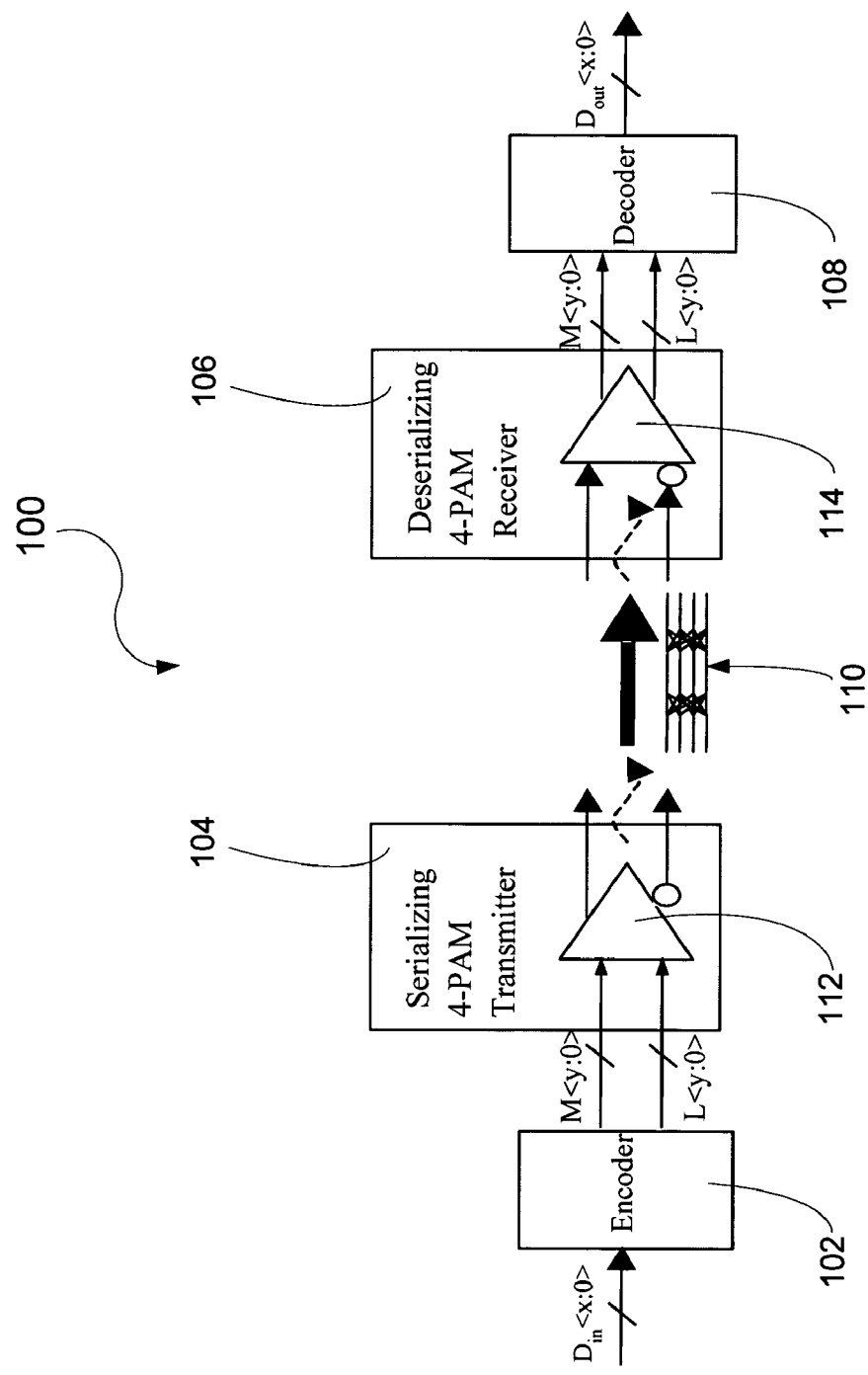
FIG. 3 shows a generic 4-PAM signaling system for supporting a technique for utilizing spare bandwidth resulting from the use of transition-limiting codes in accordance with one embodiment of the present invention.

Referring to FIG. 3, there is shown an exemplary embodiment of a 4-PAM signaling system 100 comprising an encoder 102, a serializing 4-PAM transmitter 104, a deserializing 4-PAM receiver 106, and a decoder 108. The serializing 4-PAM transmitter 104 and the deserializing 4-PAM receiver 106 are interconnected by a pair of signal carrying conductors 110.

In the embodiment of FIG. 3, the encoder 102 receives parallel input data $D_{in}$, and then encodes the received parallel input data $D_{in}$ so as to provide parallel codewords to the serializing 4-PAM transmitter 104 that are organized as MSB codewords (M) and LSB codewords (L). The MSB codewords (M) and the LSB codewords (L) together include multiple consecutive symbols. The parallel input data $D_{in}$ is received as a word having x+1 bits. The MSB codewords (M) and the LSB codewords (L) each have y+1 bits. The encoder 102 may be implemented with binary logic, as described in the above-referenced U.S. patent application Ser. No. 10/314,985.

The serializing 4-PAM transmitter 104 receives the MSB codewords (M) and the LSB codewords (L) in parallel form from the encoder 102. The serializing 4-PAM transmitter 104 comprises a differential transmitter 112 for differentially serially transmitting the received multiple consecutive symbols in the MSB codewords (M) and the LSB codewords (L) over the pair of signal carrying conductors 110 to the deserializing 4-PAM receiver 106.

The deserializing 4-PAM receiver 106 comprises a differential receiver 114 for differentially serially receiving the multiple consecutive symbols in the MSB codewords (M) and the LSB codewords (L) over the pair of signal carrying conductors 110 from the serializing 4-PAM transmitter 104. The differential receiver 114 then transmits the MSB codewords (M) and the LSB codewords (L) in parallel form to the decoder 108.

The decoder 108 is essentially the inverse of the encoder 102. That is, the decoder 108 receives the MSB codewords (M) and the LSB codewords (L) in parallel form from the deserializing 4-PAM receiver 106, and then decodes the received MSB codewords (M) and the received LSB codewords (L) so as to provide parallel output data $D_{out}$. The parallel output data $D_{out}$ is provided as a word having x+1 bits. The decoder 108 may be implemented with binary logic, as described in the above-referenced U.S. patent application Ser. No. 10/314,985.

At this point it should be noted that, while FIG. 3 shows the serializing 4-PAM transmitter 104 as having the differential transmitter 112 and the deserializing 4-PAM receiver 106 as having the differential receiver 114, the present invention is not limited in this regard. That is, the MSB codewords (M) and the LSB codewords (L) may be transmitted from the serializing 4-PAM transmitter 104 to the deserializing 4-PAM receiver 106 in a single-ended manner requiring only a single-ended transmitter and a single-ended receiver. Thus, the serializing 4-PAM transmitter 104 and the deserializing 4-PAM receiver 106 may alternatively be interconnected by a single signal carrying conductor instead of the pair of signal carrying conductors 110. Alternatively still, in an optical based system, the serializing 4-PAM transmitter 104 and the deserializing 4-PAM receiver 106 may be interconnected by an optical fiber capable carrying signals at multiple optical signal levels. Alternatively even still, in a wireless based system, the serializing 4-PAM transmitter 104 and the deserializing 4-PAM receiver 106 may not be interconnected by any fixed transmission medium, but rather the MSB codewords (M) and the LSB codewords (L) may be transmitted from the serializing 4-PAM transmitter 104 to the deserializing 4-PAM receiver 106 via a wireless protocol.

For purposes of clearly describing the present invention, assume that the 4-PAM signaling system 100 shown in FIG. 3 is utilizing a 4S5S transition-limiting code as described in the above-referenced U.S. patent application Ser. No. 10/314,985. Thus, in the embodiment of FIG. 3, the encoder 102 receives parallel input data $D_{in}$<7:0>, and then encodes the received parallel input data $D_{in}$<7:0> so as to provide parallel codewords to the serializing 4-PAM transmitter 104 that are organized as MSB codewords (M<4:0>) and LSB codewords (L<4:0>). The parallel input data $D_{in}$<7:0> is received as an 8-bit word. The MSB codewords (M<4:0>) and the LSB codewords (L<4:0>) each have 5 bits, wherein each MSB codeword (M<4:0>) has five codeword bits organized as <$C_1, C_3, C_5, C_7, C_9$> and each LSB codeword (L<4:0>) has five codeword bits organized as <$C_2, C_4, C_6, C_8, C_{10}$>. Thus, the MSB codewords (M<4:0>) and the LSB codewords (L<4:0>) together form 10-bit codewords (i.e., $C_1, C_2, C_3, C_4, C_5, C_6, C_7, C_8, C_9, C_{10}$) that are represented by groups of consecutive 2-bit symbols (i.e., $C_1$ & $C_2$, $C_3$ & $C_4$, $C_5$ & $C_6$, $C_7$ & $C_8$, and $C_9$ & $C_{10}$).

Referring to FIG. 4, there are shown symbol domain and codeword bit domain logic tables for determining when spare bandwidth associated with periodically unused outer 4-PAM signal levels may be used for other beneficial purposes in the above-described Case I scenario (see FIG. 2) in accordance with the present invention. That is, if the Case I conditions as defined in FIG. 4 are met, then the uppermost signal level (i.e., 00) of the first symbol in the second codeword (i.e., $s_1^{(k+1)}$, wherein k=1, 2, 3, . . . ) may be used for other beneficial purposes in accordance with the present invention.

In the Case I(a) scenario, the use of the uppermost signal level (i.e., 00) of the first symbol in the second codeword (i.e., $s_1^{(k+1)}$, wherein k=1, 2, 3, . . . ) comprises utilizing the $C_2$ bit in the LSB codeword (L<4:0>) to represent additional information. That is, the $C_2$ bit in the LSB codeword (L<4:0>) may be changed from a logic "1" state to a logic "0" state, thereby changing the signal level of the first symbol in the second codeword (i.e., $s_1^{(k+1)}$, wherein k=1, 2, 3, . . . ) from a logic "01" signal level (e.g., represented by +1) to a logic "00" signal level (e.g., represented by +3). This change in the logic state of the $C_2$ bit in the LSB codeword (L<4:0>) may represent any number of types of additional information, such as, for example, control information, data information, error information, framing information, synchronization information, etc.

In the Case I(b) scenario, the use of the uppermost signal level (i.e., 00) of the first symbol in the second codeword (i.e., $s_1^{(k+1)}$, wherein k=1, 2, 3, . . . ) comprises utilizing the $C_1$ bit in the MSB codeword (M<4:0>) and the $C_2$ bit in the LSB codeword (L<4:0>) to represent additional information. That is, the $C_1$ bit in the MSB codeword (M<4:0>) may be changed from a logic "1" state to a logic "0" state and the $C_2$ bit in the LSB codeword (L<4:0>) may be changed from a logic "1" state to a logic "0" state, thereby changing the signal level of the first symbol in the second codeword (i.e., $s_1^{(k+1)}$, wherein k=1, 2, 3, . . . ) from a logic "11" signal level (e.g., represented by −1) to a logic "00" signal level (e.g., represented by +3). This change in the logic states of the $C_1$ bit in the MSB codeword (M<4:0>) and the $C_2$ bit in the LSB codeword (L<4:0>) may represent any number of types of additional information, such as, for example, control information, data information, error information, framing information, synchronization information, etc.

Referring to FIG. 5, there are shown symbol domain and codeword bit domain logic tables for determining when spare bandwidth associated with periodically unused outer 4-PAM signal levels may be used for other beneficial purposes in the above-described Case II scenario (see FIG.

2) in accordance with the present invention. That is, if the Case II conditions as defined in FIG. 5 are met, then the lowermost signal level (i.e., 10) of the first symbol in the second codeword (i.e., $s_1^{(k+1)}$, wherein k=1, 2, 3, . . . ) may be used for other beneficial purposes in accordance with the present invention.

In the Case II(a) scenario, the use of the lowermost signal level (i.e., 10) of the first symbol in the second codeword (i.e., $s_1^{(k+1)}$, wherein k=1, 2, 3, . . . ) comprises utilizing the $C_2$ bit in the LSB codeword (L<4:0>) to represent additional information. That is, the $C_2$ bit in the LSB codeword (L<4:0>) may be changed from a logic "1" state to a logic "0" state, thereby changing the signal level of the first symbol in the second codeword (i.e., $s_1^{(k+1)}$, wherein k=1, 2, 3, . . . ) from a logic "11" signal level (e.g., represented by −1) to a logic "10" signal level (e.g., represented by −3). This change in the logic state of the $C_2$ bit in the LSB codeword (L<4:0>) may represent any number of types of additional information, such as, for example, control information, data information, error information, framing information, synchronization information, etc.

In the Case II(b) scenario, the use of the lowermost signal level (i.e., 10) of the first symbol in the second codeword (i.e., $Sa_1^{(k+1)}$, wherein k=1, 2, 3, . . . ) comprises utilizing the $C_1$ bit in the MSB codeword (M<4:0>) and the $C_2$ bit in the LSB codeword (L<4:0>) to represent additional information. That is, the $C_1$ bit in the MSB codeword (M<4:0>) may be changed from a logic "0" state to a logic "1" state and the $C_2$ bit in the LSB codeword (L<4:0>) may be changed from a logic "1" state to a logic "0" state, thereby changing the signal level of the first symbol in the second codeword (i.e., $s_1^{(k+1)}$, wherein k=1, 2, 3, . . . ) from a logic "01" signal level (e.g., represented by 1) to a logic "10" signal level (e.g., represented by −3). This change in the logic states of the $C_1$ bit in the MSB codeword (M<4:0>) and the $C_2$ bit in the LSB codeword (L<4:0>) may represent any number of types of additional information, such as, for example, control information, data information, error information, framing information, synchronization information, etc.

Referring to FIG. 6, there are shown symbol domain and codeword bit domain logic tables for determining when spare bandwidth associated with periodically unused outer 4-PAM signal levels may be used for other beneficial purposes in the above-described Case IV scenario (see FIG. 2) in accordance with the present invention. That is, if the Case IV conditions as defined in FIG. 6 are met, then either the uppermost signal level (i.e., 00) or the lowermost signal level (i.e., 10) of the first symbol in the second codeword (i.e., $s_1^{(k+1)}$, wherein k=1, 2, 3, . . . ) may be used for other beneficial purposes in accordance with the present invention.

In the Case IV(a) scenario, the use of the uppermost signal level (i.e., 00) or the lowermost signal level (i.e., 10) of the first symbol in the second codeword (i.e., $s_1^{(k+1)}$, wherein k=1, 2, 3, . . . ) comprises utilizing the $C_2$ bit in the LSB codeword (L<4:0>) to represent additional information. That is, the $C_2$ bit in the LSB codeword (L<4:0>) may be changed from a logic "1" state to a logic "0" state, thereby changing the signal level of the first symbol in the second codeword (i.e., $s_1^{(k+1)}$, wherein k=1, 2, 3, . . . ) from a logic "01" signal level (e.g., represented by +1) to a logic "00" signal level (e.g., represented by +3). Alternatively, the $C_2$ bit in the LSB codeword (L<4:0>) may be changed from a logic "1" state to a logic "0" state, thereby changing the signal level of the first symbol in the second codeword (i.e., $s_1^{(k+1)}$, wherein k=1, 2, 3, . . . ) from a logic "11" signal level (e.g., represented by −1) to a logic "10" signal level (e.g., represented by −3). These changes in the logic state of the $C_2$ bit in the LSB codeword (L<4:0>) may represent any number of types of additional information, such as, for example, control information, data information, error information, framing information, synchronization information, etc.

In the Case IV(b) scenario, the use of the uppermost signal level (i.e., 00) or the lowermost signal level (i.e., 10) of the first symbol in the second codeword (i.e., $s_1^{(k+1)}$, wherein k=1, 2, 3, . . . ) comprises utilizing the $C_1$ bit in the MSB codeword (M<4:0>) and the $C_2$ bit in the LSB codeword (L<4:0>) to represent additional information. That is, the $C_1$ bit in the MSB codeword (M<4:0>) may be changed from a logic "1" state to a logic "0" state and the $C_2$ bit in the LSB codeword (L<4:0>) may be changed from a logic "1" state to a logic "0" state, thereby changing the signal level of the first symbol in the second codeword (i.e., $s_1^{(k+1)}$, wherein k=1, 2, 3, . . . ) from a logic "11" signal level (e.g., represented by −1) to a logic "00" signal level (e.g., represented by +3). Alternatively, the $C_1$ bit in the MSB codeword (M<4:0>) may be changed from a logic "0" state to a logic "1" state and the $C_2$ bit in the LSB codeword (L<4:0>) may be changed from a logic "1" state to a logic "0" state, thereby changing the signal level of the first symbol in the second codeword (i.e., $s_1^{(k+1)}$, wherein k=1, 2, 3, . . . ) from a logic "01" signal level (e.g., represented by 1) to a logic "10" signal level (e.g., represented by −3). These changes in the logic states of the $C_1$ bit in the MSB codeword (M<4:0>) and the $C_2$ bit in the LSB codeword (L<4:0>) may represent any number of types of additional information, such as, for example, control information, data information, error information, framing information, synchronization information, etc.

Figure 7A:
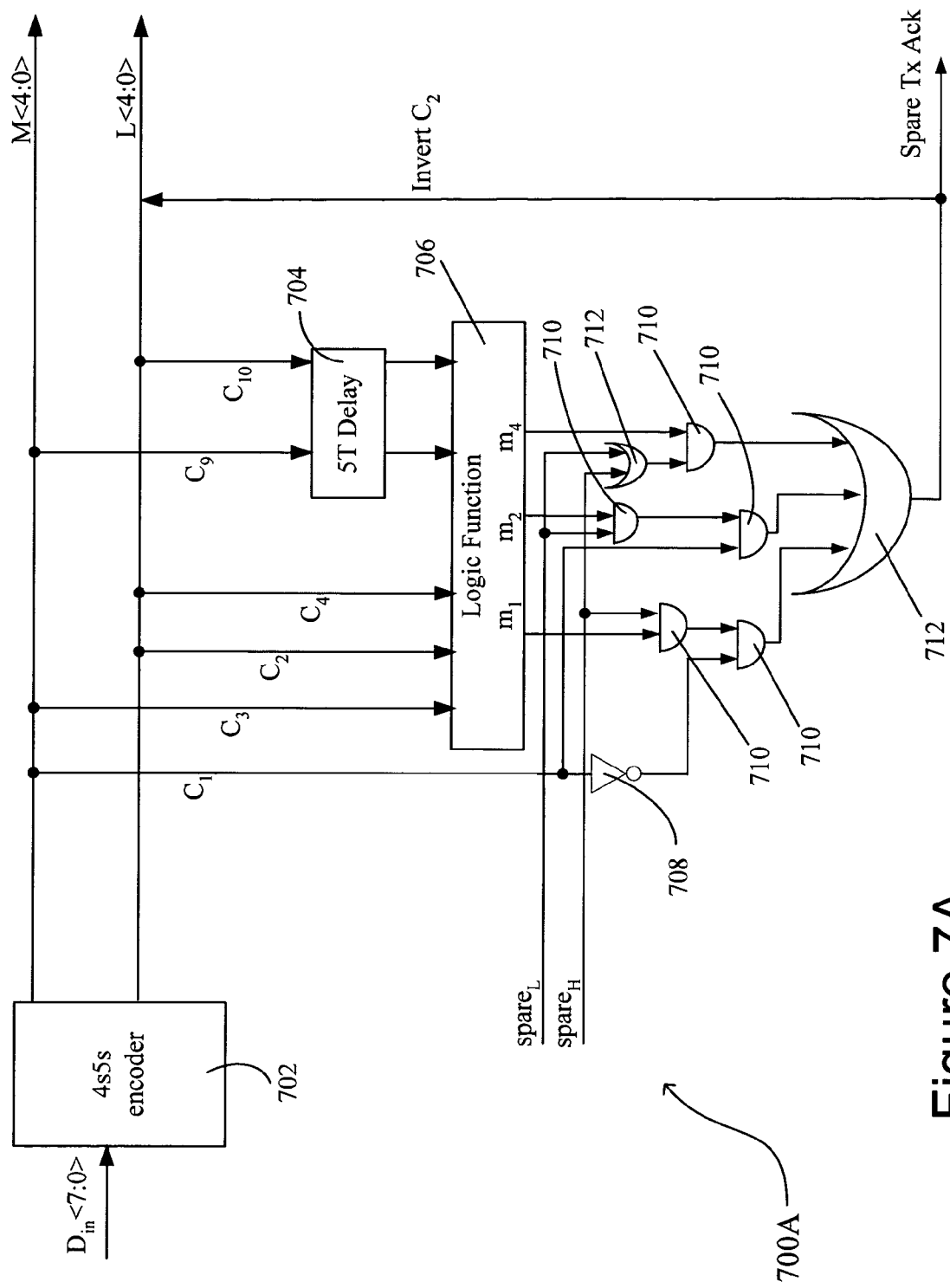
FIGS. 7A and 7B show modified 4S5S encoder circuitry for use in utilizing spare bandwidth resulting from the use of a 4S5S transition-limiting code in a 4-PAM signaling system in accordance with embodiments of the present invention.

Referring to FIG. 7A, there is shown modified 4S5S encoder circuitry 700A for use in utilizing spare bandwidth resulting from the use of a 4S5S transition-limiting code, such as described in the above-referenced U.S. patent application Ser. No. 10/314,985, in a 4-PAM signaling system, such as shown in FIG. 3, for the Case I(a), Case II(a), and Case IV(a) scenarios described above in FIGS. 4, 5, and 6, respectively, in accordance with the present invention. The modified 4S5S encoder circuitry 700A comprises a 4S5S encoder 702, delay circuitry 704, logic function circuitry 706, an inverter circuit 708, a plurality of logic "AND" function circuits 710, and a plurality of logic "OR" function circuits 712.

The 4S5S encoder 702 receives parallel input data $D_{in}$<7:0>, and then encodes the received parallel input data $D_{in}$<7:0> so as to provide parallel codewords to a serializing 4-PAM transmitter (not shown) that are organized as MSB codewords (M<4:0>) and LSB codewords (L<4:0>). As described above, the parallel input data $D_{in}$<7:0> is received as an 8-bit word. The MSB codewords (M<4:0>) and the LSB codewords (L<4:0>) each have 5 bits, wherein each MSB codeword (M<4:0>) has five codeword bits organized as <$C_1$, $C_3$, $C_5$, $C_7$, $C_9$> and each LSB codeword (L<4:0>) has five codeword bits organized as <$C_2$, $C_4$, $C_6$, $C_8$, $C_{10}$>. Thus, the MSB codewords (M<4:0>) and the LSB codewords (L<4:0>) together form 10-bit codewords that are represented by groups of consecutive 2-bit symbols. The 4S5S encoder 702 may be implemented with binary logic.

All of the other circuitry in the modified 4S5S encoder circuitry 700A of FIG. 7A operates to determine whether or not the $C_2$ bit in the LSB codeword (L<4:0>) may be changed from a logic "1" state to a logic "0" state so that spare bandwidth associated with periodically unused outer 4-PAM signal levels may be used for other beneficial purposes in accordance with the present invention. That is, the delay circuitry 704 provides a 5T delay for both the $C_9$ bit in the MSB codeword (M<4:0>) and the $C_{10}$ bit in the LSB codeword (L<4:0>), wherein T is the symbol period as defined above. The logic function circuitry 706 operates according to the symbol domain and codeword bit domain logic tables shown in FIGS. 4–6, and the $m_1$, $m_2$, and $m_4$ outputs are defined by the functions shown in FIGS. 4–6. The logic function circuitry 706 may be implemented with binary logic.

Figure 7B:
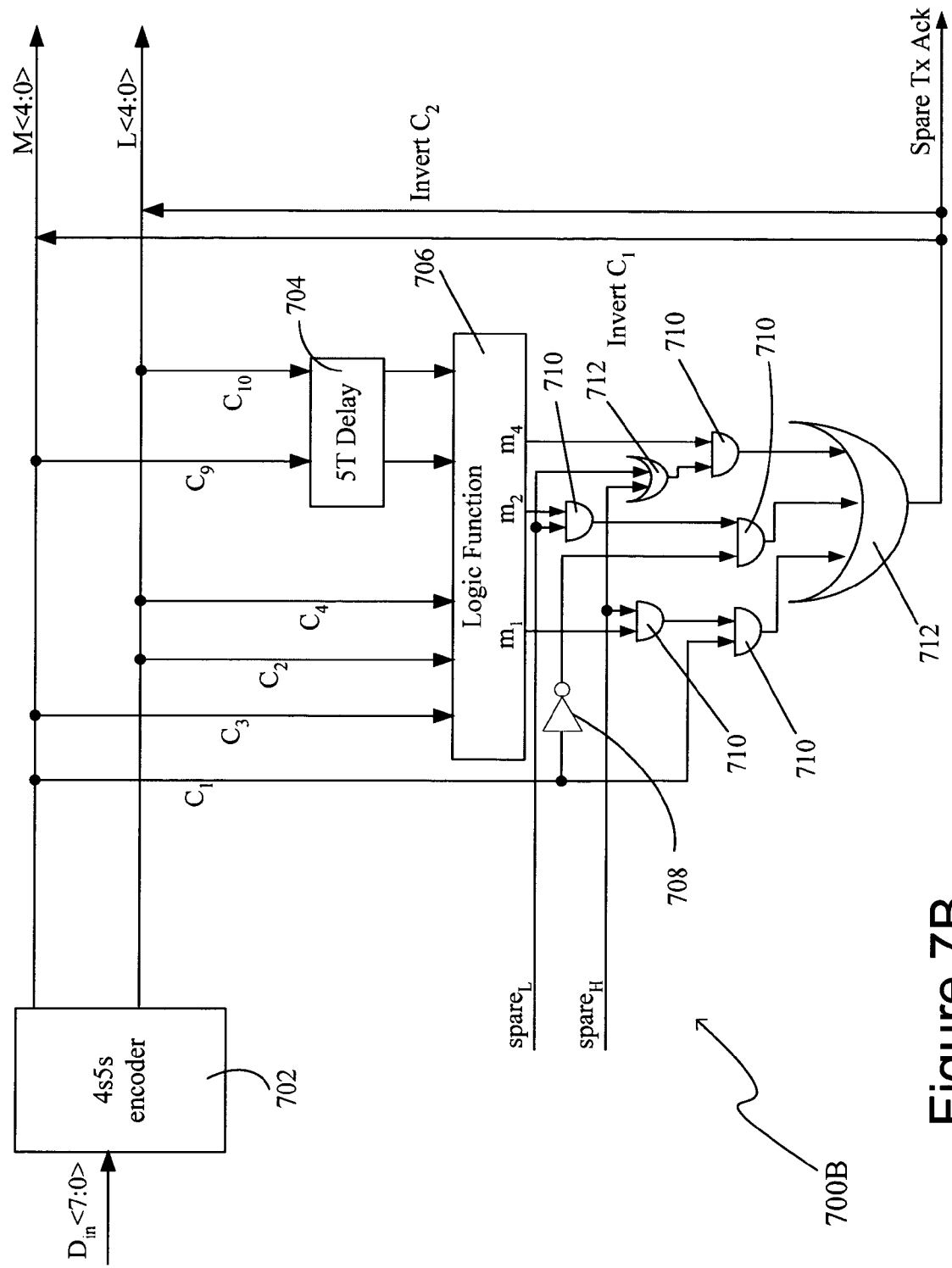

The inverter circuit 708 inverts the state of the $C_1$ bit in the MSB codeword (M<4:0>) for use by one of the plurality of logic "AND" function circuits 710. Outputs $m_1$, $m_2$, and $m_4$ from the logic function circuitry and spare bandwidth input signals (i.e., $spare_H$ and $spare_L$), which represent additional information to be transmitted in spare bandwidth associated with periodically unused outer 4-PAM signal levels, are applied to the remaining plurality of logic "OR" function circuits 712 and logic "AND" function circuits 710 so as to generate "Invert $C_2$" and "Spare TX Ack" output signals. More specifically, the $spare_H$ signal represents additional information to be transmitted in spare bandwidth associated with the uppermost signal level (i.e., 00) of the first symbol in the second codeword (i.e., $s_1^{(k+1)}$, wherein k=1, 2, 3, . . . ), and the $spare_L$ signal represents additional information to be transmitted in spare bandwidth associated with the lowermost signal level (i.e., 10) of the first symbol in the second codeword (i.e., $s_1^{(k+)}$, wherein k=1, 2, 3, . . . ). The "Invert $C_2$" signal is used to change the $C_2$ bit in the LSB codeword (L<4:0>) from a logic "1" state to a logic "0" state so that spare bandwidth associated with periodically unused outer 4-PAM signal levels may be used for other beneficial purposes in accordance with the present invention. As described above, this change in the logic state of the $C_2$ bit in the LSB codeword (L<4:0>) may represent any number of types of additional information, such as, for example, control information, data information, error information, framing information, synchronization information, etc. The "Spare TX Ack" signal provides a notification to circuitry that generates the $spare_H$ and $spare_L$ signals (not shown) that the additional information represented by the $spare_H$ or $spare_L$ signals has actually been transmitted. Referring to FIG. 7B, there is shown modified 4S5S encoder circuitry 700B for use in utilizing spare bandwidth resulting from the use of a 4S5S transition-limiting code, such as described in the above-referenced U.S. patent application Ser. No. 10/314,985, in a 4-PAM signaling system, such as shown in FIG. 3, for the Case I(b), Case II(b), and Case IV(b) scenarios described above in FIGS. 4, 5, and 6, respectively, in accordance with the present invention. The modified 4S5S encoder circuitry 700B of FIG. B is similar to the modified 4S5S encoder circuitry 700A of FIG. 7A, except that the inverter circuit 708 is connected differently so as to allow for the generation of an additional "Invert $C_1$" signal for use in changing the logic state of the $C_1$ bit in the MSB codeword (M<4:0>).

Figure 8A:
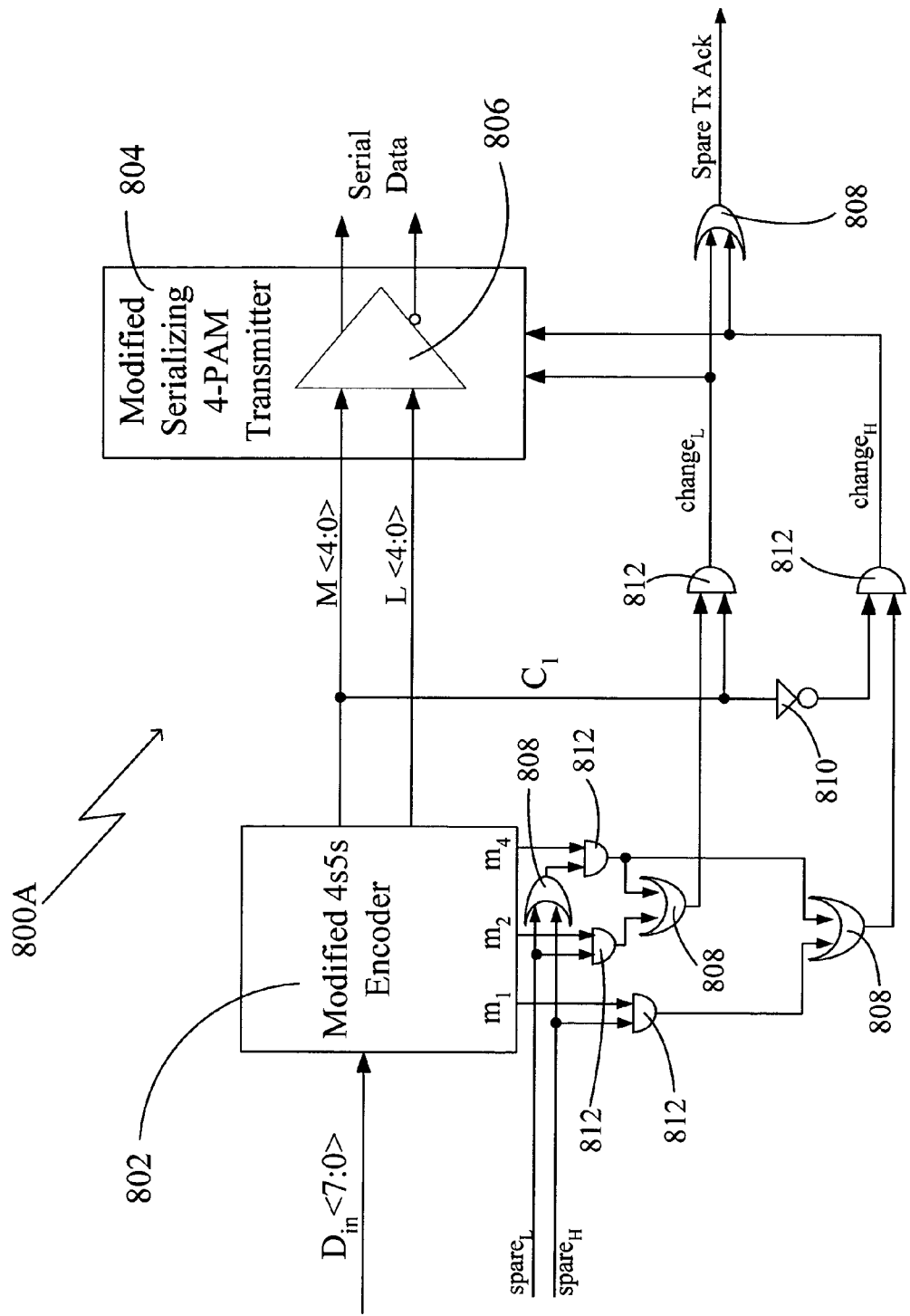
FIGS. 8A and 8B show modified 4S5S encoder and serializing 4-PAM transmitter circuitry for use in utilizing spare bandwidth resulting from the use of a 4S5S transition-limiting code in a 4-PAM signaling system in accordance with embodiments of the present invention.

Referring to FIG. 8A, there is shown an alternative embodiment to the modified 4S5S encoder circuitry 700A of FIG. 7A. That is, FIG. 8A shows modified 4S5S encoder and serializing 4-PAM transmitter circuitry 800A for use in utilizing spare bandwidth resulting from the use of a 4S5S transition-limiting code, such as described in the above-referenced U.S. Patent application Ser. No. 10/314,985, in a 4-PAM signaling system, such as shown in FIG. 3, for the Case I(a), Case II(a), and Case IV(a) scenarios described above in FIGS. 4, 5, and 6, respectively, in accordance with the present invention. The modified circuitry 800A comprises a modified 4S5S encoder 802, a modified serializing 4-PAM transmitter 804, a plurality of logic "OR" function circuits 808, an inverter circuit 810, and a plurality of logic "AND" function circuits 812.

The modified 4S5S encoder 802 receives parallel input data $D_{in}$<7:0>, and then encodes the received parallel input data $D_{in}$<7:0> so as to provide parallel codewords to the modified serializing 4-PAM transmitter 804 that are organized as MSB codewords (M<4:0>) and LSB codewords (L<4:0>). As described above, the parallel input data $D_{in}$<7:0> is received as an 8-bit word. The MSB codewords (M<4:0>) and the LSB codewords (L<4:0>) each have 5 bits, wherein each MSB codeword (M<4:0>) has five codeword bits organized as <$C_1$, $C_3$, $C_5$, $C_7$, $C_9$> and each LSB codeword (L<4:0>) has five codeword bits organized as <$C_2$, $C_4$, $C_6$, $C_8$, $C_{10}$>. Thus, the MSB codewords (M<4:0>) and the LSB codewords (L<4:0>) together form 10-bit codewords that are represented by groups of consecutive 2-bit symbols.

The modified 4S5S encoder 802 is functionally equivalent to the combination of the 4S5S encoder 702, the delay circuitry 704, and the logic function circuitry 706 of the modified 4S5S encoder circuitry 700A of FIG. 7A. Thus, the modified 4S5S encoder 802 operates in a manner that is functionally equivalent to the above-described operation of the 4S5S encoder 702, the delay circuitry 704, and the logic function circuitry 706 of the modified 4S5S encoder circuitry 700A of FIG. 7A. The modified 4S5S encoder 802 may be implemented with binary logic.

The inverter circuit 810 inverts the state of the $C_1$ bit in the MSB codeword (M<4:0>) for use by one of the plurality of logic "AND" function circuits 812. Outputs $m_1$, $m_2$, and $m_4$ from the modified 4S5S encoder 802 and spare bandwidth input signals (i.e., $spare_H$ and $spare_L$), which represent additional information to be transmitted in spare bandwidth associated with periodically unused outer 4-PAM signal levels, are applied to most of the remaining plurality of logic "OR" function circuits 808 and logic "AND" function circuits 812 so as to generate "$change_H$" and "$change_L$" control signals for use by the modified serializing 4-PAM transmitter 804. More specifically, the $spare_H$ control signal represents additional information to be transmitted by the modified serializing 4-PAM transmitter 804 in spare bandwidth associated with the uppermost signal level (i.e., 00) of the first symbol in the second codeword (i.e., $s_1^{(k+1)}$, wherein k=1, 2, 3, . . . . ), and the $spare_L$ control signal represents additional information to be transmitted by the modified serializing 4-PAM transmitter 804 in spare bandwidth associated with the lowermost signal level (i.e., 10) of the first symbol in the second codeword (i.e., $s_1^{(k+1)}$, wherein k=1, 2, 3, . . . ). The modified serializing 4-PAM transmitter 804 comprises a differential transmitter 806 for differentially serially transmitting the parallel codewords received from the modified 4S5S encoder 802 based upon the logic states of the $change_H$ and $change_L$ control signals. That is, based upon the logic states of the $change_H$ and $change_L$ control signals, the modified serializing 4-PAM transmitter 804 may change the signal levels of the serial data formed from the MSB codewords (M<4:0>) and the LSB codewords (L<4:0>) received from the modified 4S5S encoder 802 so that spare bandwidth associated with periodically unused outer 4-PAM signal levels may be used for other beneficial purposes in accordance with the present invention.

In the embodiment of FIG. 8A, the control signals (i.e., $change_H$ and $change_L$) are used to change the logic state of the $C_2$ bit in the LSB codeword (L<4:0>). More specifically, in the embodiment of FIG. 8A, when the $change_H$ or $change_L$ control signal is activated, the modified serializing 4-PAM transmitter 804 changes the signal level of the first symbol of the code word (i.e., M<4:0> and L<4:0>, where M<4:0> comprises $C_1$, $C_3$, $C_5$, $C_7$ $C_9$ and where L<4:0> comprises $C_2$, $C_4$, $C_6$, $C_8$ $C_{10}$) from an inner signal level to a corresponding outer signal level. When the change$_H$ control signal is activated, the signal level of the first symbol of the code word from Modified 4S5S Encoder 802 is at a logic signal level "01" (e.g., represented by +1), and the modified serializing 4_PAM transmitter 804 changes the signal level of this symbol to "00" (e.g., represented by +3). When the change$_L$ control signal is activated, the signal level of the first symbol of the code word from Modified 4S5S Encoder 802 is at a logic signal level "11" (represented by −1), and the modified serializing 4_PAM transmitter 804 changes the signal level of this symbol to "10" (e.g., represented by −3).

As described above, this change in the signal levels of the serial data formed from the MSB codewords (M<4:0>) and the LSB codewords (L<4:0>) received from the modified 4S5S encoder 802 may represent any number of types of additional information, such as, for example, control information, data information, error information, framing information, synchronization information, etc.

The change$_H$ and change$_L$ control signals are also applied to a final remaining one of the plurality of logic "OR" function circuits 808 so as to generate a "Spare TX Ack" signal, which provides a notification to circuitry that generates the spare$_H$ and spare$_L$ control signals (not shown) that the additional information represented by the spare$_H$ or spare$_L$ control signals has actually been transmitted by the modified serializing 4-PAM transmitter 804.

Figure 8B:
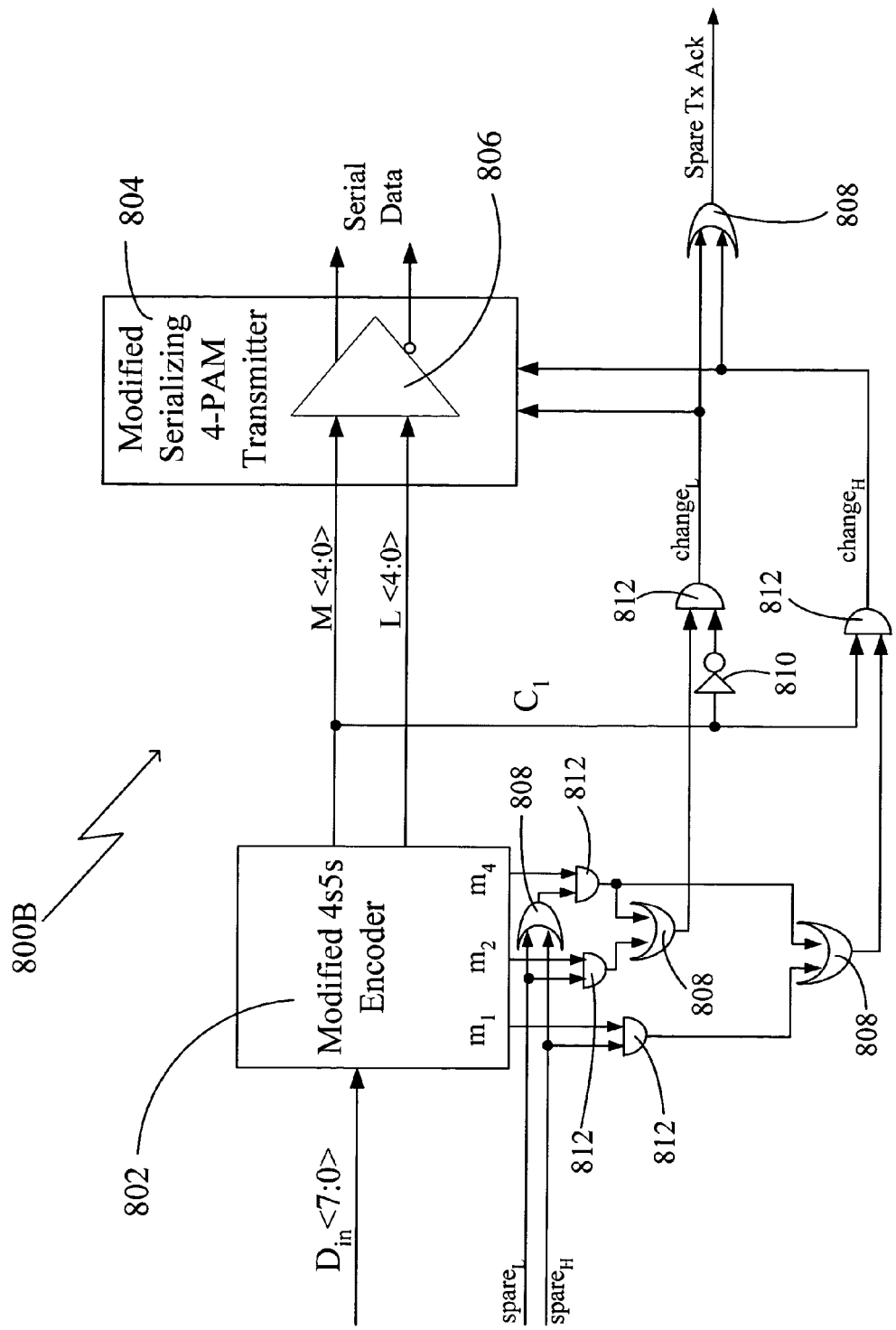

Referring to FIG. 8B, there is shown an alternative embodiment to the modified 4S5S encoder circuitry 700B of FIG. 7B. That is, FIG. 8B shows modified 4S5S encoder and serializing 4-PAM transmitter circuitry 800B for use in utilizing spare bandwidth resulting from the use of a 4S5S transition-limiting code, such as described in the above-referenced U.S. patent application Ser. No. 10/314,985, in a 4-PAM signaling system, such as shown in FIG. 3, for the Case I(b), Case II(b), and Case IV(b) scenarios described above in FIGS. 4, 5, and 6, respectively, in accordance with the present invention. The modified circuitry 800B of FIG. 8B is similar to the modified circuitry 800A of FIG. 8A, except that the control signals (i.e., change$_H$ and change$_L$ control signals) are now used to change the logic states of both the $C_1$ bit in the MSB codeword (M<4:0>) and the $C_2$ bit in the LSB codeword (L<4:0>). In FIG. 8B, the inverter circuit 810 is connected differently than it is connected in FIG. 8A. In FIG. 8B, inverter circuit 810 is connected so that it inverts the state of the $C_1$ bit in the MSB codeword (M<4:0>) for use by another one of the plurality of logic "AND" function circuits 812. In FIG. 8B, when the change$_H$ or change$_L$ control signal is activated, the modified serializing 4_PAM transmitter 804 changes the signal level of the first symbol of the code word from an inner signal level to an outer signal level. When the change$_H$ control signal is activated, the signal level of the first symbol of the code word from Modified 4S5S Encoder 802 is at logic signal level "11" (e.g., represented by −1), and the modified serializing 4_PAM transmitter 804 changes the signal level of this symbol to "00" (e.g., represented by +3). When the change$_L$ control signal is activated, the signal level of the first symbol of the code word from Modified 4S5S Encoder 802 is at logic signal level "01" (e.g., represented by +1), and the modified serializing 4_PAM transmitter 804 changes the signal level of this symbol to "10" (e.g., represented by −3).

Figure 9A:
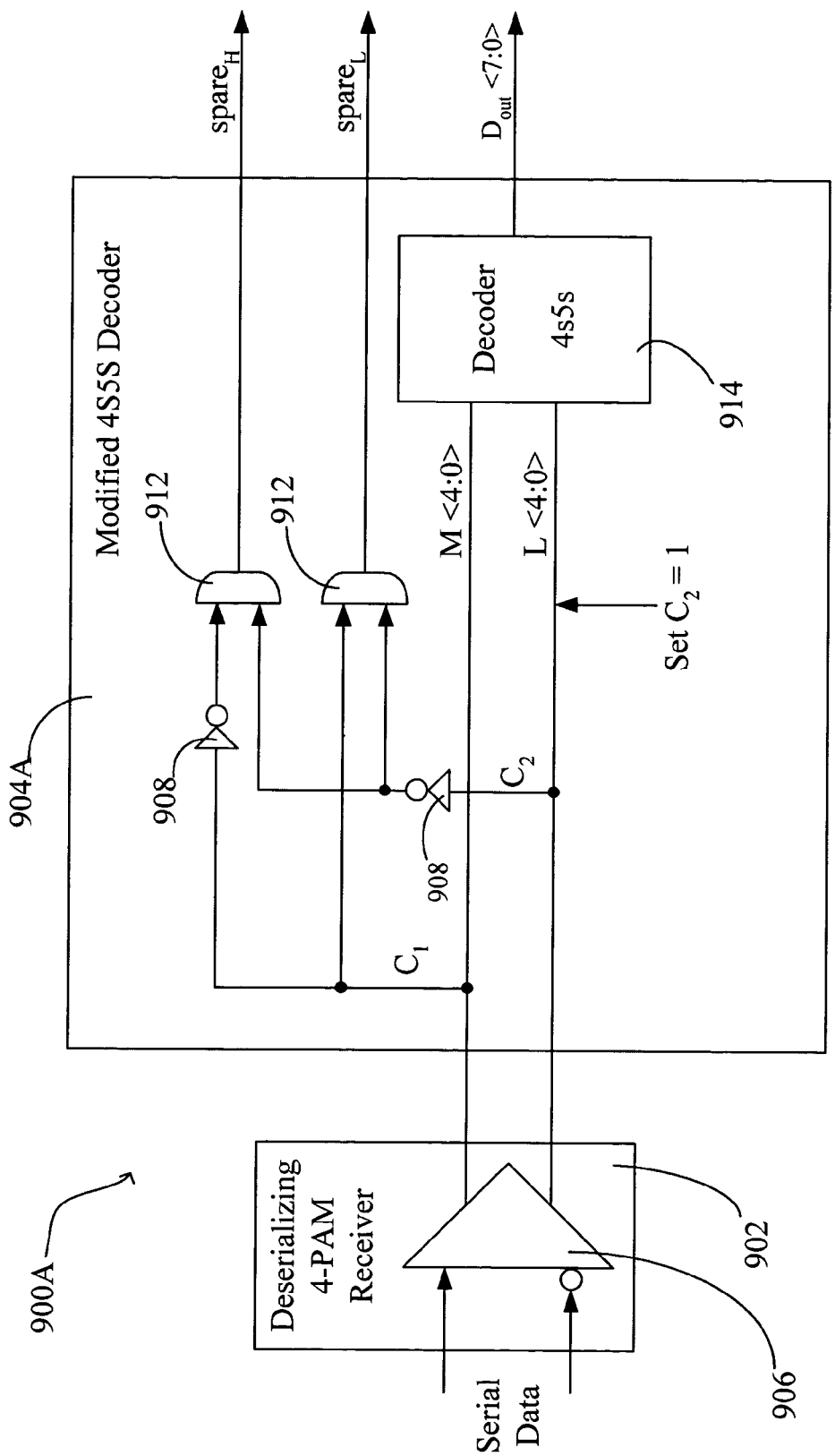
FIGS. 9A and 9B show circuitry for use in receiving and decoding codewords that have been modified to utilize spare bandwidth resulting from the use of a 4S5S transition-limiting code in a 4-PAM signaling system in accordance with embodiments of the present invention.

Referring to FIG. 9A, there is shown circuitry 900A for use in receiving and decoding codewords that have been modified to utilize spare bandwidth resulting from the use of a 4S5S transition-limiting code, such as described in the above-referenced U.S. patent application Ser. No. 10/314, 985, in a 4-PAM signaling system, such as shown in FIG. 3, for the Case I(a), Case II(a), and Case IV(a) scenarios described above in FIGS. 4, 5, and 6, respectively, in accordance with the present invention. The circuitry 900A comprises a deserializing 4-PAM receiver 902 and a modified 4S5S decoder 904A. The deserializing 4-PAM receiver 902 comprises a differential receiver 906 for differentially serially receiving the multiple consecutive symbols in the MSB codewords (M<4:0>) and the LSB codewords (L<4: 0>) from a serializing 4-PAM transmitter (not shown). The differential receiver 906 then transmits the MSB codewords (M<4:0>) and the LSB codewords (L<4:0>) in parallel form to the modified 4S5S decoder 904A.

The modified 4S5S decoder 904A comprises a plurality of inverter circuits 908, a plurality of logic "AND " function circuits 912, and a 4S5S decoder 914. The modified 4S5S decoder 904A receives the MSB codewords (M<4:0>) and the LSB codewords (L<4:0>) in parallel form from the differential receiver 906. A first of the plurality of inverter circuits 908 inverts the state of the $C_1$ bit in the received MSB codeword (M<4:0>) for use by one of the plurality of logic "AND" function circuits 912. A second of the plurality of inverter circuits 908 inverts the state of the $C_2$ bit in the received LSB codeword (L<4:0>) for use by both the plurality of logic "AND" function circuits 912. The plurality of logic "AND" function circuits 912 receive the inverted and non-inverted $C_1$ bit and the inverted $C_2$ bit, and generate output signals (i.e., spare$_H$ and spare$_L$ signals) indicating if the received codeword contains additional information in the spare bandwidth associated with periodically unused outer 4-PAM signal levels in accordance with the present invention. As described above, this additional information may comprise, for example, control information, data information, error information, framing information, synchronization information, etc.

A "Set $C_2$=1" signal is used to change the $C_2$ bit in the LSB codeword (L<4:0>) from a logic "0" state to a logic "1" state so as to return the LSB codeword (L<4:0>) to its original unmodified state.

The 4S5S decoder 914 receives the MSB codewords (M<4:0>) and the updated LSB codewords (L<4:0>) in parallel form, and then decodes the received MSB codewords (M<4:0>) and the received LSB codewords (L<4:0>) so as to provide parallel output data $D_{out}$<7:0>. The parallel output data $D_{out}$<7:0> is provided as an 8-bit word. The 4S5S decoder 914 may be implemented with binary logic.

Figure 9B:
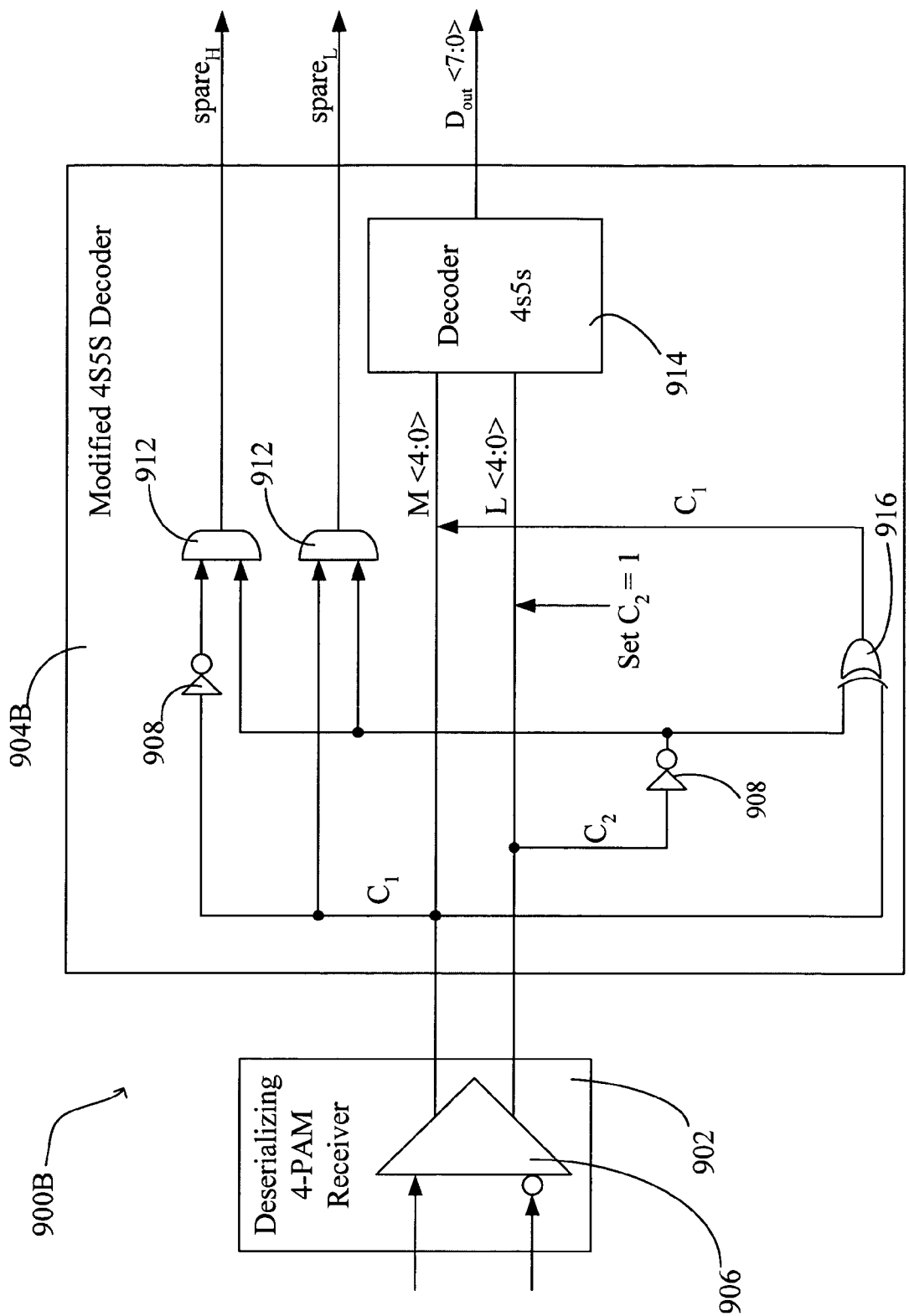

Referring to FIG. 9B, there is shown circuitry 900B for use in receiving and decoding codewords that have been modified to utilize spare bandwidth resulting from the use of a 4S5S transition-limiting code, such as described in the above-referenced U.S. patent application Ser. No. 10/314, 985, in a 4-PAM signaling system, such as shown in FIG. 3, for the Case I(b), Case II(b), and Case IV(b) scenarios described above in FIGS. 4, 5, and 6, respectively, in accordance with the present invention. The circuitry 900B of FIG. 9B is similar to the circuitry 900A of FIG. 9A, except for the addition of an "EXCLUSIVE-OR" logic function circuit 916 for generating a "$C_1$" signal for use in changing the logic state of the $C_1$ bit in the MSB codeword (M<4:0>) so as to return the MSB codeword (M<4:0>) to its original unmodified state.

Figure 10A:
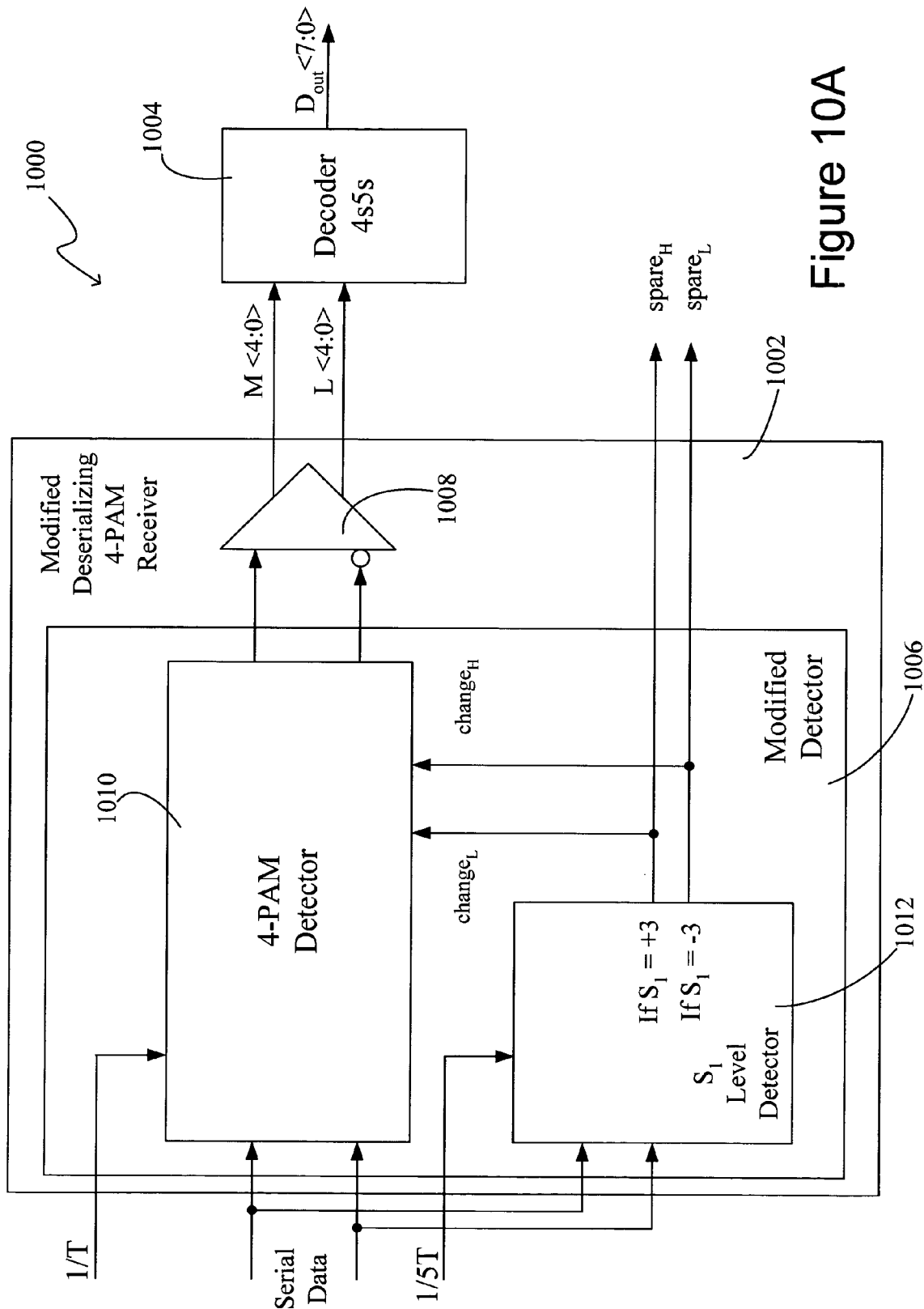
FIGS. 10A and 10B show alternative circuitry for use in receiving and decoding codewords that have been modified to utilize spare bandwidth resulting from the use of a 4S5S transition-limiting code in a 4-PAM signaling system in accordance with embodiments of the present invention.

Referring to FIG. 10A, there is shown an alternative embodiment to the circuitry 900A of FIG. 9A and the circuitry 900B of FIG. 9B. That is, FIG. 10A also shows circuitry 1000 for use in receiving and decoding codewords that have been modified to utilize spare bandwidth resulting from the use of a 4S5S transition-limiting code, such as described in the above-referenced U.S. patent application Ser. No. 10/314,985, in a 4-PAM signaling system, such as shown in FIG. 3, for the Case I(a), Case II(a), and Case IV(a) scenarios described above in FIGS. 4, 5, and 6, respectively, in accordance with the present invention. The circuitry 1000 comprises a modified deserializing 4-PAM receiver 1002 and a 4S5S decoder 1004. The modified deserializing 4-PAM receiver 1002 comprises a modified detector 1006 and a differential receiver 1008. The modified detector 1006 comprises a 4-PAM detector 1010 and an $S_1$ level detector 1012. The 4-PAM detector 1010 detects signal levels in multiple consecutive symbols in differentially serially transmitted MSB codewords (M<4:0>) and LSB codewords (L<4:0>) received from a serializing 4-PAM transmitter (not shown). These detected signal levels are provided to the $s_1$ level detector 1012, which specifically determines if the first symbol (i.e., $S_1$) in every received codeword is at a logic "00" signal level (e.g., represented by +3) or at a logic "10" signal level (e.g., represented by −3). If the $S_1$ level detector 1012 determines that the first symbol (i.e., $S_1$) in a received codeword is at a logic "00" signal level (e.g., represented by +3), then the $S_1$ level detector 1012 generates an output signal (i.e., spare$_H$) indicating that the received codeword contains additional information in the spare bandwidth associated with periodically unused outer 4-PAM signal levels in accordance with the present invention. Also, if the $S_1$ level detector 1012 determines that the first symbol (i.e., $S_1$) in a received codeword is at a logic "10" signal level (e.g., represented by −3), then the $S_1$ level detector 1012 generates an output signal (i.e., spare$_L$) indicating that the received codeword contains additional information in the spare bandwidth associated with periodically unused outer 4-PAM signal levels in accordance with the present invention. As described above, this additional information may comprise, for example, control information, data information, error information, framing information, synchronization information, etc.

The $S_1$ level detector 1012 also provides control signals back to the 4-PAM detector 1010. In the embodiment of FIG. 10A, the control signals (i.e., change$_H$ and change$_L$) are used to change the logic state of the $C_2$ bit in the received LSB codeword (L<4:0>) from a logic "0" state to a logic "1" state. More specifically, if the $S_1$ level detector 1012 determines that the first symbol (i.e., $S_1$) in a received codeword is at a logic "00" signal level (e.g., represented by +3), then the $S_1$ level detector 1012 generates a control signal (i.e., change$_L$) for the 4-PAM detector 1010, which causes the 4-PAM detector 1010 to change the signal level of the serial data received at the 4-PAM detector 1010 so as to return the LSB codeword (L<4:0>) contained in the received serial data to its original unmodified state. In the circuitry 1000 depicted in FIG. 10A, if the $S_1$ level detector 1012 determines that the first symbol (i.e., $S_1$) in a received codeword is at a logic "00" signal level (e.g., represented by +3), then the $S_1$ level detector 1012 generates a control signal (i.e., change$_L$) for the 4-PAM detector 1010, which causes the 4-PAM detector 1010 to change the signal level of the serial data received at the 4-PAM detector 1010 so as change the $s_1$ level from "00" to "01" (which results in a return of the LSB codeword (L<4:0>) contained in the received serial data to its original unmodified state). If the $S_1$ level detector 1012 determines that $s_1$ in a received codeword is at a logic "10" signal level (e.g., represented by −3), then the $S_1$ level detector 1012 generates a control signal (i.e., change$_H$) for the 4-PAM detector 1010, which causes the 4-PAM detector 1010 to change the signal level of the serial data received at the 4-PAM detector 1010 so as change the $S_1$ level from "10" to "11" (which results in a return of the LSB codeword contained in the received serial data to its original unmodified state).

Figure 10B:
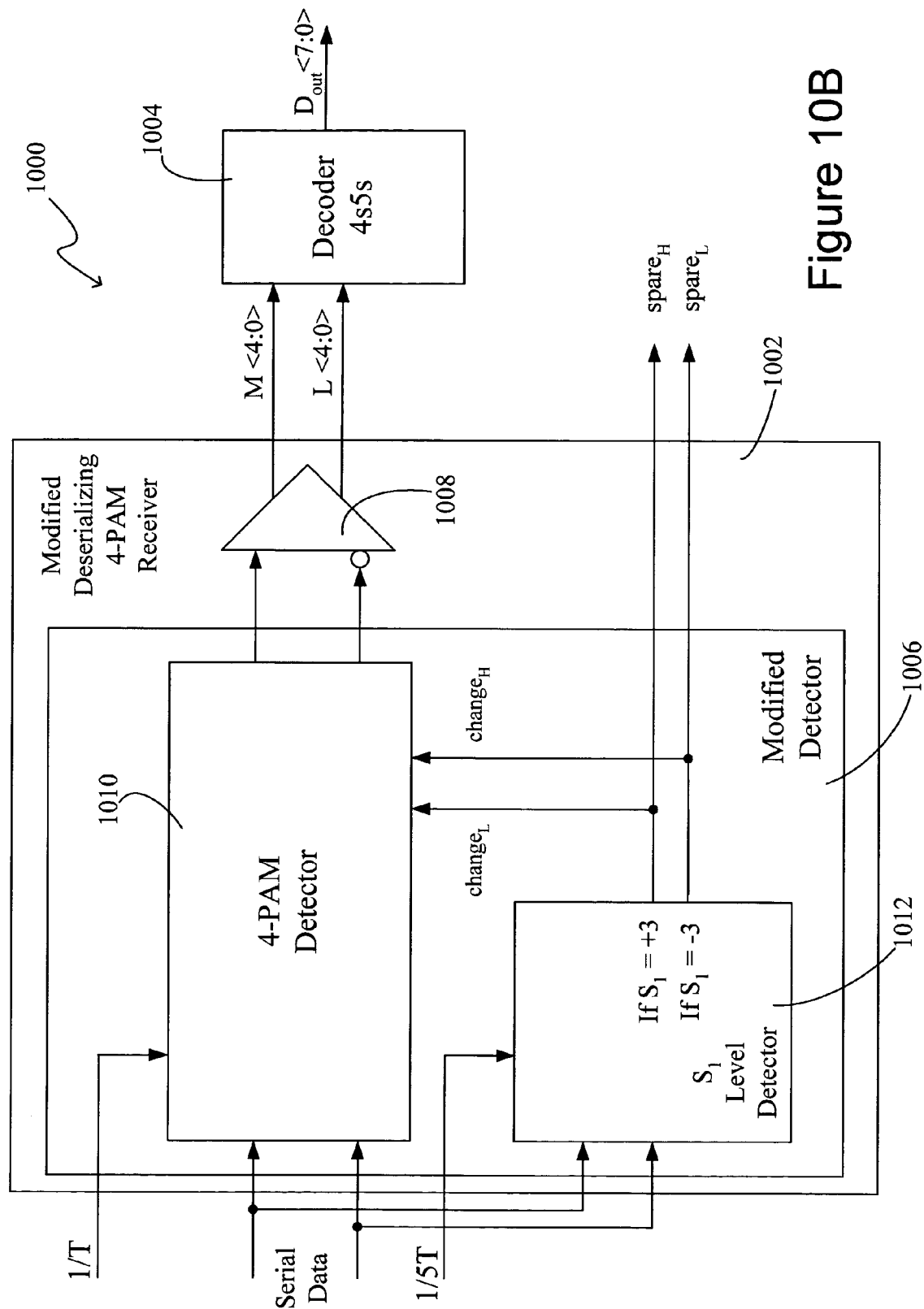

In the embodiment of FIG. 10B, the control signals (i.e., change$_H$ and change$_L$) are used to change the logic states of both the $C_1$ bit in the received MSB codeword (M<4:0>) and the $C_2$ bit in the received LSB codeword (L<4:0>). More specifically, in the circuitry 1000 depicted in FIG. 10B, if the $S_1$ level detector 1012 determines that the first symbol (i.e., $S_1$) in a received codeword is at a logic "00" signal level (e.g., represented by +3), then the $S_1$ level detector 1012 generates a control signal (i.e., change$_L$) for the 4-PAM detector 1010, which causes the 4-PAM detector 1010 to change the signal level of the serial data received at the 4-PAM detector 1010 so as change the $S_1$ level from "00" to "11" (which results in a return of the received MSB codeword (M<4:0>)and the received LSB codeword (L<4:0>) to their original unmodified states). If the $S_1$ level detector 1012 determines that $S_1$ in a received codeword is at a logic "10" signal level (e.g., represented by −3), then the $S_1$ level detector 1012 generates a control signal (i.e., change$_H$) for the 4-PAM detector 1010, which causes the 4-PAM detector 1010 to change the signal level of the serial data received at the 4-PAM detector 1010 so as change the $S_1$ level from "10" to "01" (which results in a return of the received MSB codeword (M<4:0>) and the received LSB codeword (L<4:0>) to their original unmodified states).

The modified detector 1006 provides updated differential serial codewords to the differential receiver 1008, which operates similar to the differential receiver 906 in FIGS. 9A and 9B. The differential receiver 1008 provides MSB codewords (M<4:0>) and updated LSB codewords (L<4:0>) in parallel form to the 4S5S decoder 1004, which operates similar to the 4S5S decoder 914 in FIGS. 9A and 9B.

At this point it should be noted that transmission errors may also be detected using a modified 4S5S decoder in accordance with the present invention. More specifically, referring to FIG. 11, there are shown symbol domain and codeword bit domain logic tables for determining when spare bandwidth associated with periodically unused outer 4-PAM signal levels may be used to detect transmission errors in accordance with the present invention. That is, if the error detection conditions as defined in FIG. 11 are met, then an error is present in a codeword.

Figure 12A:
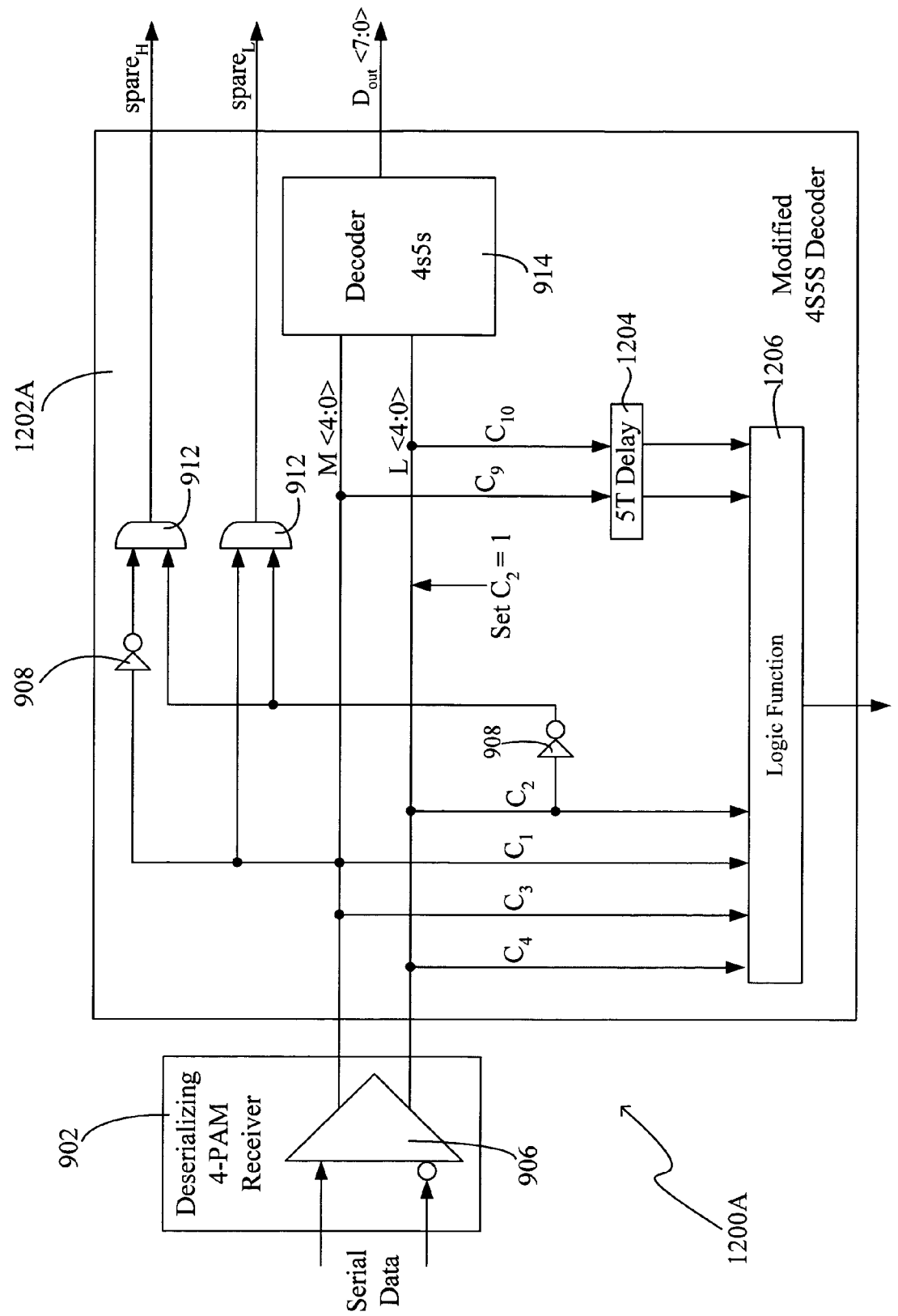
FIGS. 12A and 12B show circuitry for use in receiving and decoding codewords that may have been modified to utilize spare bandwidth resulting from the use of a 4S5S transition-limiting code in a 4-PAM signaling system in accordance with embodiments of the present invention.

Referring to FIG. 12A, there is shown circuitry 1200A for use in receiving and decoding codewords that may have been modified to utilize spare bandwidth resulting from the use of a 4S5S transition-limiting code, such as described in the above-referenced U.S. patent application Ser. No. 10/314,985, in a 4-PAM signaling system, such as shown in FIG. 3, for the Case I(a), Case II(a), and Case IV(a) scenarios described above in FIGS. 4, 5, and 6, respectively, in accordance with the present invention. The circuitry 1200A comprises a deserializing 4-PAM receiver 902 and a modified 4S5S decoder 1202A. The deserializing 4-PAM receiver 902 in FIG. 12A operates similar to the deserializing 4-PAM receiver 902 in FIG. 9A, and thus no further description is required. The modified 4S5S decoder 1202A operates similar to the modified 4S5S decoder 904A in FIG. 9A, except for additional error detection circuitry comprising delay circuitry 1204 and logic function circuitry 1206.

The delay circuitry 1204 provides a 5T delay for both the $C_9$ bit in the MSB codeword (M<4:0>) and the $C_{10}$ bit in the LSB codeword (L<4:0>), wherein T is the symbol period as defined above. The logic function circuitry 1206 operates according to the symbol domain and codeword bit domain logic tables shown in FIG. 11. That is, when the error detection conditions as defined in FIG. 11 are met, then the logic function circuitry 1206 generates an error signal (i.e., Error Detected). The logic function circuitry 1206 may be implemented with binary logic.

Figure 12B:
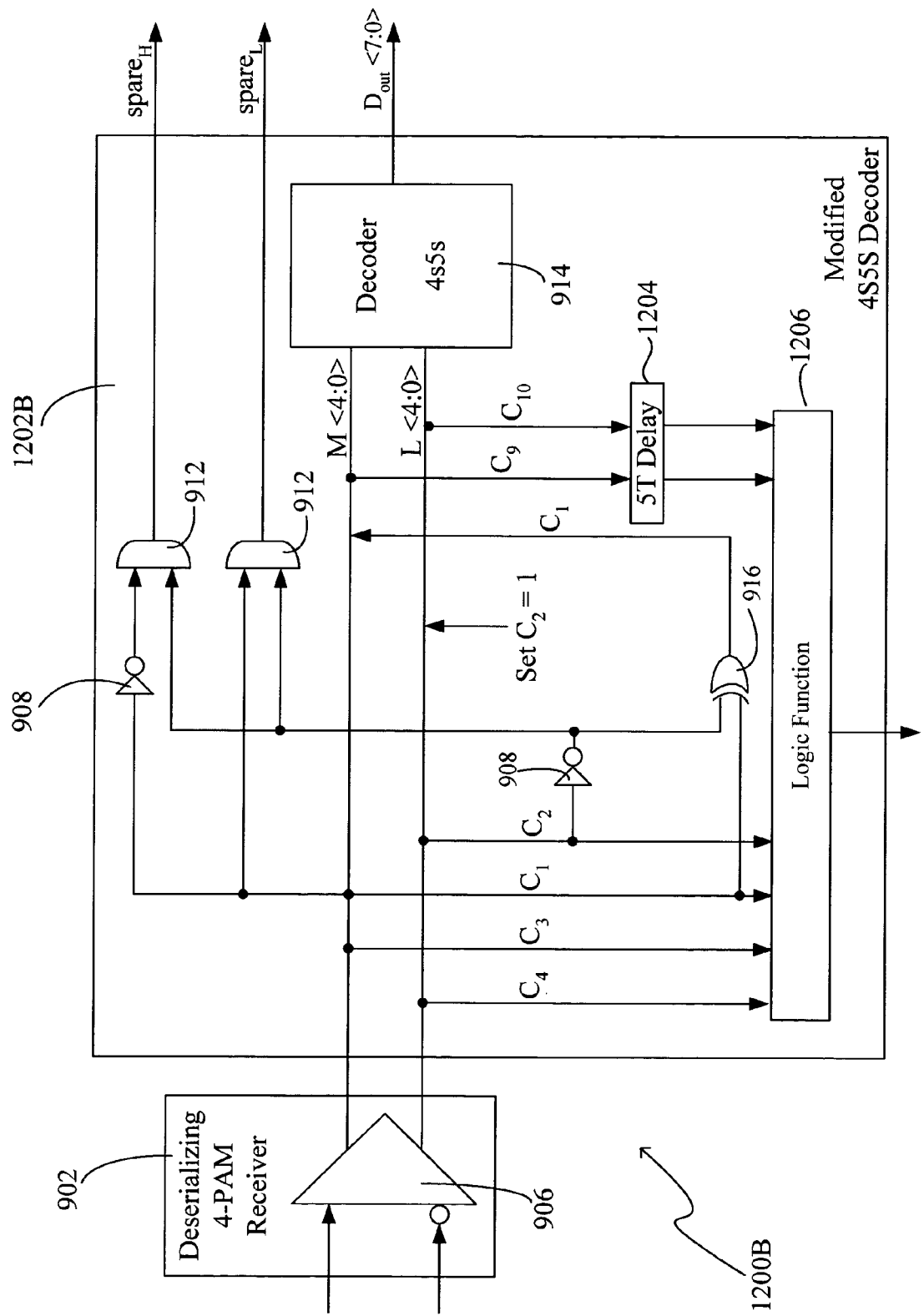

Referring to FIG. 12B, there is shown circuitry 1200B for use in receiving and decoding codewords that may have been modified to utilize spare bandwidth resulting from the use of a 4S5S transition-limiting code, such as described in the above-referenced U.S. patent application Ser. No. 10/314,985, in a 4-PAM signaling system, such as shown in FIG. 3, for the Case I(b), Case II(b), and Case IV(b) scenarios described above in FIGS. 4, 5, and 6, respectively, in accordance with the present invention. The circuitry 1200B of FIG. 12B is similar to the circuitry 1200A of FIG. 12A, except that the circuitry 1200B of FIG. 12B comprises a modified 4S5S decoder 1202B that operates similar to the modified 4S5S decoder 904B in FIG. 9B, except for the additional error detection circuitry comprising the delay circuitry 1204 and the logic function circuitry 1206.

At this point it should be noted that utilizing spare bandwidth resulting from the use of transition-limiting codes in multi-PAM signaling systems in accordance with the present invention as described above may involve the processing of input data and the generation of output data to some extent. This input data processing and output data generation may be implemented in hardware or software. For example, as described above, specific electronic components may be employed in an encoder, decoder, or other similar or related circuitry for implementing the functions associated with utilizing spare bandwidth resulting from the use of transition-limiting codes in multi-PAM signaling systems in accordance with the present invention as described above. Alternatively, one or more processors operating in accordance with stored instructions may implement the functions associated with utilizing spare bandwidth resulting from the use of transition-limiting codes in multi-PAM signaling systems in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various modifications of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for utilizing spare bandwidth resulting from the use of a transition-limiting code in a multi-level signaling system, the transition-limiting code having a characteristic wherein a signal level is periodically unused, the method comprising the step of:
   modifying the transition-limiting code such that the periodically unused signal level is used to represent additional information.

2. The method of claim 1, wherein the transition-limiting code is formed by encoding digital values represented by sets of N bits to provide corresponding sets of P symbols, wherein N is greater than P.

3. The method of claim 2, wherein each set of P symbols is formed with Q bits, wherein Q is greater than N.

4. The method of claim 3, wherein N=8 and Q=10.

5. The method of claim 4, wherein each symbol represents two bits.

6. The method of claim 1, wherein the step of modifying comprises:
   changing the logic state of at least one codeword bit in the transition-limiting code.

7. The method of claim 1, wherein the additional information comprises one or more of control information, data information, error information, framing information, and synchronization information.

8. The method of claim 1, further comprising the step of:
   transmitting the modified transition-limiting code.

9. The method of claim 8, wherein the modified transition-limiting code is transmitted at four signal levels on a single transmission medium.

10. The method of claim 9, wherein the single transmission medium comprises a single electrical conductor.

11. The method of claim 9, wherein the single transmission medium comprises a differential pair of electrical conductors.

12. The method of claim 9, wherein the single transmission medium comprises an optical fiber.

13. The method of claim 8, further comprising the steps of:
   receiving the transmitted modified transition-limiting code; and
   detecting the additional information in the received modified transition-limiting code.

14. The method of claim 13, further comprising the step of:
   removing the additional information from the received modified transition-limiting code so as to return the modified transition-limiting code to an original unmodified state.

15. The method of claim 14, further comprising the step of:
   decoding the original transition-limiting code after the additional information is removed.

16. The method of claim 8, wherein the transition-limiting code has a further characteristic wherein a plurality of signal levels are periodically unused, wherein one or more of the plurality of periodically unused signal levels is restricted from being used to represent additional information at least at certain times, further comprising the steps of:
   receiving the transmitted modified transition-limiting code; and
   detecting the use of a signal level that has been restricted.

17. The method of claim 16, further comprising the step of:
   generating an error signal based at least in part upon the detected restricted signal level use.

18. An apparatus for utilizing spare bandwidth resulting from the use of a transition-limiting code in a multi-level signaling system, the transition-limiting code having a characteristic wherein a signal level is periodically unused, the apparatus comprising:
 a modifier for modifying the transition-limiting code such that the periodically unused signal level is used to represent additional information.

19. The apparatus of claim 18, wherein the transition-limiting code is formed by encoding digital values represented by sets of N bits to provide corresponding sets of P symbols, wherein N is greater than P.

20. The apparatus of claim 19, wherein each set of P symbols is formed with Q bits, wherein Q is greater than N.

21. The apparatus of claim 20, wherein N=8 and Q=10.

22. The apparatus of claim 21, wherein each symbol represents two bits.

23. The apparatus of claim 18, wherein the modifier modifies the transition-limiting code by changing the logic state of at least one codeword bit in the transition-limiting code.

24. The apparatus of claim 18, wherein the additional information comprises one or more of control information, data information, error information, framing information, and synchronization information.

25. The apparatus of claim 18, further comprising:
 a transmitter for transmitting the modified transition-limiting code.

26. The apparatus of claim 25, wherein the modified transition-limiting code is transmitted at four signal levels on a single transmission medium.

27. The apparatus of claim 26, wherein the single transmission medium comprises a single electrical conductor.

28. The apparatus of claim 26, wherein the single transmission medium comprises a differential pair of electrical conductors.

29. The apparatus of claim 26, wherein the single transmission medium comprises an optical fiber.

30. The apparatus of claim 25, further comprising:
 a receiver for receiving the transmitted modified transition-limiting code; and
 a detector for detecting the additional information in the received modified transition-limiting code.

31. The apparatus of claim 30, wherein the detector also removes the additional information from the received modified transition-limiting code so as to return the modified transition-limiting code to an original unmodified state.

32. The apparatus of claim 31, further comprising:
 a decoder for decoding the original transition-limiting code after the additional information is removed.

33. The apparatus of claim 25, wherein the transition-limiting code has a further characteristic wherein a plurality of signal levels are periodically unused, wherein one or more of the plurality of periodically unused signal levels is restricted from being used to represent additional information at least at certain times, further comprising:
 a receiver for receiving the transmitted modified transition-limiting code; and
 a detector for detecting the use of a signal level that has been restricted.

34. The apparatus of claim 33, wherein the detector also generates an error signal based at least in part upon the detected restricted signal level use.

35. A method for utilizing spare bandwidth resulting from the use of a transition-limiting code in a multi-level signaling system, the method comprising the steps of:
 encoding digital values using a transition-limiting code, the transition-limiting code having a characteristic wherein a signal level is periodically unused; and
 modifying the transition-limiting code such that the periodically unused signal level is used to represent additional information.

36. The method of claim 35, further comprising the step of:
 transmitting the modified transition-limiting code.

37. The method of claim 36, further comprising the steps of:
 receiving the transmitted modified transition-limiting code; and
 detecting the additional information in the received modified transition-limiting code.

38. The method of claim 37, further comprising the step of:
 removing the additional information from the received modified transition-limiting code so as to return the modified transition-limiting code to an original unmodified state.

39. The method of claim 38, further comprising the step of:
 decoding the original transition-limiting code after the additional information is removed.

40. The method of claim 36, wherein the transition-limiting code has a further characteristic wherein a plurality of signal levels are periodically unused, wherein one or more of the plurality of periodically unused signal levels is restricted from being used to represent additional information at least at certain times, further comprising the steps of:
 receiving the transmitted modified transition-limiting code; and
 detecting the use of a signal level that has been restricted.

41. The method of claim 40, further comprising the step of:
 generating an error signal based at least in part upon the detected restricted signal level use.

42. An apparatus for utilizing spare bandwidth resulting from the use of a transition-limiting code in a multi-level signaling system, the apparatus comprising:
 an encoder for encoding digital values using a transition-limiting code, the transition-limiting code having a characteristic wherein a signal level is periodically unused; and
 a modifier for modifying the transition-limiting code such that the periodically unused signal level is used to represent additional information.

43. The apparatus of claim 42, further comprising:
 a transmitter for transmitting the modified transition-limiting code.

44. The apparatus of claim 43, further comprising:
 a receiver for receiving the transmitted modified transition-limiting code; and
 a detector for detecting the additional information in the received modified transition-limiting code.

45. The apparatus of claim 44, wherein the detector also removes the additional information from the received modified transition-limiting code so as to return the modified transition-limiting code to an original unmodified state.

46. The apparatus of claim 45, further comprising:
 a decoder for decoding the original transition-limiting code after the additional information is removed.

47. The apparatus of claim 43, wherein the transition-limiting code has a further characteristic wherein a plurality of signal levels are periodically unused, wherein one or more of the plurality of periodically unused signal levels is restricted from being used to represent additional information at least at certain times, further comprising:
- a receiver for receiving the transmitted modified transition-limiting code; and
- a detector for detecting the use of a signal level that has been restricted.

48. The apparatus of claim 47, wherein the detector also generates an error signal based at least in part upon the detected restricted signal level use.

49. An apparatus for utilizing spare bandwidth resulting from the use of a transition-limiting code in a multi-level signaling system, the transition-limiting code having a characteristic wherein a signal level is periodically unused, the apparatus comprising:
- means for modifying the transition-limiting code such that the periodically unused signal level is used to represent additional information; and
- means for detecting the additional information in the modified transition-limiting code.

* * * * *